United States Patent
Stone et al.

(10) Patent No.: US 9,012,014 B2
(45) Date of Patent: Apr. 21, 2015

(54) WEB MATERIAL EXHIBITING VIEWING-ANGLE DEPENDENT COLOR AND COMPRISING A PLURALITY OF DISCRETE EXTENDED ELEMENTS

(75) Inventors: Keith Joseph Stone, Fairfield, OH (US); Roger Dale Young, Ft. Mitchell, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 794 days.

(21) Appl. No.: 12/721,965

(22) Filed: Mar. 11, 2010

(65) Prior Publication Data

US 2010/0233439 A1   Sep. 16, 2010

Related U.S. Application Data

(60) Provisional application No. 61/159,906, filed on Mar. 13, 2009.

(51) Int. Cl.
  *B32B 3/30* (2006.01)
  *B32B 3/26* (2006.01)
  (Continued)

(52) U.S. Cl.
  CPC . *B32B 3/263* (2013.01); *B26F 1/26* (2013.01); *B29C 59/022* (2013.01); *B29C 59/04* (2013.01); *B29C 59/06* (2013.01); *B29C 65/56* (2013.01);
  (Continued)

(58) Field of Classification Search
  USPC ......... 428/172, 141, 148, 149, 156, 212, 213, 428/216
  See application file for complete search history.

(56) References Cited

U.S. PATENT DOCUMENTS 3,719,736 A   3/1973   Woodruff
(Continued)

FOREIGN PATENT DOCUMENTS

DE   34 39 555 A1   4/1986
EP   0 598 970      6/1994
(Continued)

OTHER PUBLICATIONS

English Machine Translation for JP 09-011369 A. Jan. 14, 1997.*
PCT Search Report, mailed Oct. 7, 2011, 4 pages.
Nagarajan, Abbott, Yao; Rubber-Assisted Embossing Process; School of Polymer, Textile & Fiber Eng., Georgia Institute of Technology, Atlanta, GA 30332; ANTEC (2007) vol. 5, pp. 2921-2925, 5 pages.
(Continued)

*Primary Examiner* — Maria Veronica Ewald
*Assistant Examiner* — Nancy Johnson
(74) *Attorney, Agent, or Firm* — Andrew J. Hagerty

(57) ABSTRACT

A colored web material exhibiting viewing-angle dependent color and comprising a plurality of discrete extended elements. In one embodiment, the colored web material comprises a first web material and a second web material, wherein the first web material comprises a first polymer having first refractive properties and the second web material comprises a second polymer having second refractive properties, wherein said first refractive properties of said first polymer are different than said second refractive properties of said second polymer. In one embodiment, the colored web material comprises an interference pigment incorporated in at least one layer of the colored web material. In one embodiment, the discrete extended elements have a diameter of less than about 500 microns. In one embodiment, the colored web material comprises at least about 95 discrete extended elements per square centimeter. In one embodiment, the discrete extended elements have an aspect ratio of at least about 0.2.

32 Claims, 13 Drawing Sheets
(8 of 13 Drawing Sheet(s) Filed in Color)

(51) Int. Cl.

| | | |
|---|---|---|
| *B26F 1/26* | (2006.01) | |
| *B29C 59/02* | (2006.01) | |
| *B29C 65/56* | (2006.01) | |
| *B29C 65/00* | (2006.01) | |
| *B32B 3/28* | (2006.01) | |
| *B32B 7/02* | (2006.01) | |
| *B32B 27/20* | (2006.01) | |
| *B32B 38/06* | (2006.01) | |
| *B29C 59/04* | (2006.01) | |
| *B29C 59/06* | (2006.01) | |
| *B32B 38/12* | (2006.01) | |
| *B32B 37/00* | (2006.01) | |

(52) U.S. Cl.
CPC .............. *B29C 66/21* (2013.01); *B29C 66/45* (2013.01); *B29C 66/91935* (2013.01); *B31F 2201/0733* (2013.01); *B31F 2201/0738* (2013.01); *B32B 3/28* (2013.01); *B32B 7/02* (2013.01); *B32B 27/20* (2013.01); *B32B 38/06* (2013.01); *B32B 38/12* (2013.01); *B32B 2037/0092* (2013.01); *B32B 2323/04* (2013.01); *B32B 2323/10* (2013.01); *B29C 66/9121* (2013.01); *B29C 66/91216* (2013.01); *B29C 66/91411* (2013.01); *B29C 66/9161* (2013.01); *B29C 66/919* (2013.01)

(56) References Cited

U.S. PATENT DOCUMENTS

| | | |
|---|---|---|
| 3,779,285 A | 12/1973 | Sinibaldo |
| 3,911,187 A | 10/1975 | Raley |
| 4,211,743 A | 7/1980 | Nauta et al. |
| 4,319,868 A | 3/1982 | Riemersma et al. |
| 4,343,848 A | 8/1982 | Leonard, Jr. |
| 4,546,029 A | 10/1985 | Cancio et al. |
| 4,695,422 A | 9/1987 | Curro et al. |
| 4,778,644 A | 10/1988 | Curro et al. |
| 5,158,819 A | 10/1992 | Goodman et al. |
| 5,281,371 A | 1/1994 | Tamura et al. |
| 5,451,449 A * | 9/1995 | Shetty et al. ............... 428/204 |
| 5,650,215 A | 7/1997 | Mazurek et al. |
| 5,670,110 A | 9/1997 | Dirk et al. |
| 5,858,515 A | 1/1999 | Stokes et al. |
| 5,945,196 A | 8/1999 | Ricker et al. |
| 6,045,894 A | 4/2000 | Jonza et al. |
| H1927 H | 12/2000 | Chen et al. |
| 6,531,230 B1 | 3/2003 | Weber et al. |
| 6,645,330 B2 | 11/2003 | Pargass et al. |
| 6,719,742 B1 | 4/2004 | McCormack et al. |
| 6,788,463 B2 | 9/2004 | Merrill et al. |
| 6,797,366 B2 | 9/2004 | Hanson et al. |
| 6,846,445 B2 | 1/2005 | Kim et al. |
| 7,037,569 B2 | 5/2006 | Curro et al. |
| 7,172,801 B2 | 2/2007 | Hoying et al. |
| 7,303,861 B2 | 12/2007 | Gray et al. |
| 7,364,687 B2 | 4/2008 | Maschino et al. |
| 7,402,723 B2 | 7/2008 | Stone et al. |
| 7,642,207 B2 | 1/2010 | Boehmer et al. |
| 7,736,688 B2 | 6/2010 | Oetjen et al. |
| 7,799,254 B2 | 9/2010 | Harvey et al. |
| 8,241,543 B2 | 8/2012 | O'Donnell et al. |
| 2001/0014796 A1 | 8/2001 | Mizutani et al. |
| 2002/0154406 A1 | 10/2002 | Merrill et al. |
| 2003/0135174 A1* | 7/2003 | Benecke et al. ............ 604/367 |
| 2003/0187170 A1 | 10/2003 | Burmeister |
| 2003/0201582 A1 | 10/2003 | Gray |
| 2003/0228445 A1 | 12/2003 | Vaughn et al. |
| 2004/0046290 A1 | 3/2004 | Kim et al. |
| 2004/0121120 A1* | 6/2004 | Gray et al. ................. 428/131 |
| 2004/0122395 A1 | 6/2004 | Stone et al. |
| 2004/0126531 A1* | 7/2004 | Harvey et al. ............... 428/43 |
| 2004/0131820 A1 | 7/2004 | Turner et al. |
| 2004/0161586 A1 | 8/2004 | Cree et al. |
| 2004/0209041 A1 | 10/2004 | Muth et al. |
| 2005/0019530 A1 | 1/2005 | Merrill et al. |
| 2005/0096614 A1 | 5/2005 | Perez et al. |
| 2005/0191496 A1 | 9/2005 | Gray et al. |
| 2005/0279470 A1 | 12/2005 | Redd et al. |
| 2006/0087053 A1 | 4/2006 | O'Donnell et al. |
| 2006/0286343 A1 | 12/2006 | Curro et al. |
| 2007/0014977 A1* | 1/2007 | Graney et al. ............... 428/212 |
| 2007/0062658 A1 | 3/2007 | Wiwi et al. |
| 2007/0261224 A1 | 11/2007 | McLeod |
| 2008/0200320 A1 | 8/2008 | Buckner et al. |
| 2008/0264275 A1 | 10/2008 | Wilhelm et al. |
| 2009/0155540 A1 | 6/2009 | Merrill et al. |
| 2012/0105957 A1 | 5/2012 | Merrill et al. |

FOREIGN PATENT DOCUMENTS

| | | | |
|---|---|---|---|
| GB | 1344054 A | | 1/1974 |
| JP | 09011369 A | * | 1/1997 |
| JP | 4062055 B2 | | 6/2004 |
| WO | WO-97/13633 | | 4/1997 |
| WO | WO-2007-069964 A1 | | 6/2007 |
| WO | WO 2008-103650 A2 | | 8/2008 |
| WO | WO 2008-120959 A1 | | 10/2008 |

OTHER PUBLICATIONS

Chang, Yang; Gas pressurized hot embossing for transcription of micro-features; Microsystem Technologies (2003) vol. 10, pp. 76-80, 5 pages; Springer-Verlag.

Dreuth, Heiden; Thermoplastic structuring of thin polymer films; Sensors and Actuators (1999) vol. 78, pp. 198-204, 7 pages; Institute of Applied Physics, University of Giessen, Heinrich-Buff-Ring 16 D-35392 Giessen, Germany; Elsevier Science S.A.

Heckele, Schomburg; Review on micro molding of thermoplastic polymers; Institute of Physics Publishing; Journal of Micromechanics and Microengineering (2004) vol. 14, No. 3, pp. R1-R14, 14 pages; IOP Publishing Ltd.

Kimerling, Liu, Kim, Yao; Rapid hot embossing of polymer microfeatures; Microsystem Technologies (2006) vol. 12, No. 8, pp. 730-735, 6 pages; School of Polymer, Textile and Fiber Eng., Georgia Institute of Technology, Atlanta GA 30332.

Nagarajan, Yao, Ellis, Azadegan; Through-Thickness Embossing Process for Fabrication of Three-Dimensional Thermoplastic Parts; School of Polymer, Textile & Fiber Eng., Georgia Institute of Technology, Atlanta GA 30332 and Delphi Research Labs, Shelby Township, Michigan 48315; Polymer Engineering and Science (2007) vol. 47, No. 12, pp. 2075-2084, 10 pages.

Rowland, King; Polymer deformation and filling modes during microembossing; Woodruff School of Mechanical Engineering, Georgia Institute of Technology, Atlanta, GA 30329-0405; Institute of Physics Publishing; Journal of Micromechanics and Microengineering (2004) vol. 14, No. 12, pp. 1625-1632, 8 pages; IOP Publishing Ltd.

Truckenmuller, Giselbrecht; Microthermoforming of flexible, not-buried hollow microstructures for chip-based life sciences applications; IEE Proceedings-Nanobiotechnology (Aug. 2004) vol. 151, No. 4, pp. 163-166; 4 pages.

Yao, Nagarajan; Cold Forging Method for Polymer Microfabrication; Department of Mechanical Engineering, Oakland University, Rochester, MI 48309; Polymer Engineering and Science (Oct. 2004) vol. 44, No. 10, pp. 1998-2004, 7 pages.

Yao, Nagarajan, Li, Yi; A Two-Station Embossing Process for Rapid Fabrication of Surface Microstructures on Thermoplastic Polymers; School of Polymer, Textile & Fiber Eng., Georgia Institute of Technology, Atlanta, GA 30332 and Department of Industrial, Welding and Systems Engineering, The Ohio State University, Columbus, OH 43210; Polymer Engineering and Science (2007) vol. 47, No. 4, pp. 530-539, 10 pages; Wiley InterScience; Society of Plastics Engineers.

Yao, Kuduva-Raman-Thanumoorthy; An enlarged process window for hot embossing; School of Polymer, Textile & Fiber Eng., Georgia Institute of Technology, Atlanta, GA 30332; Journal of Micromechanics and Microengineering (2008) vol. 18, pp. 1-7; 7 pages; IOP Publishing Ltd.

* cited by examiner

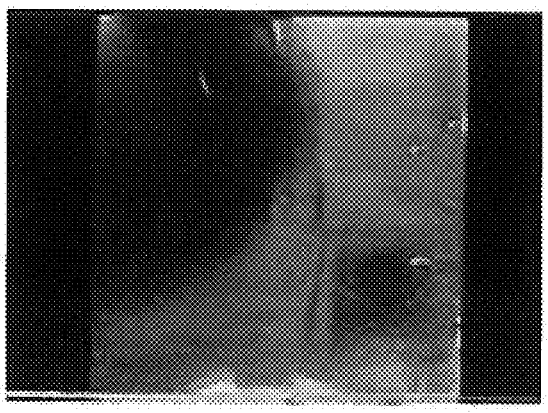
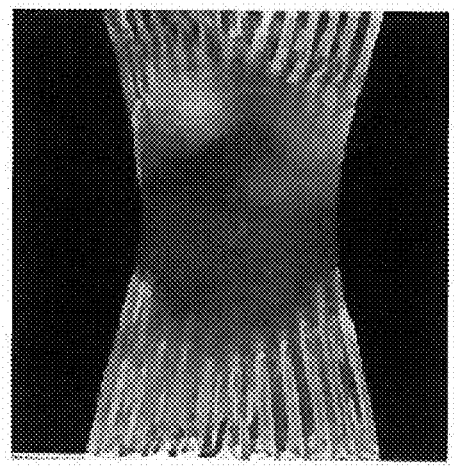
FIG. 7A　　　　　　　　FIG. 7B
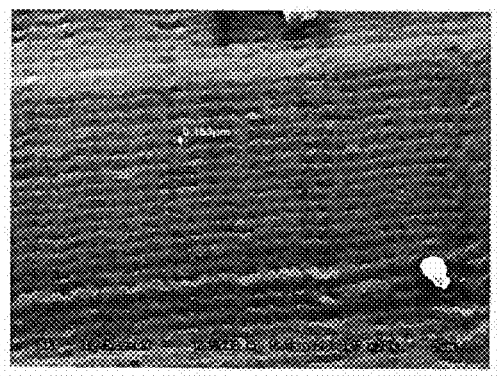
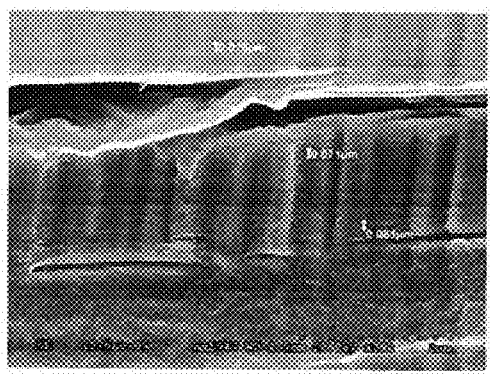
FIG. 8A　　　　　　　　FIG. 8B

WEB MATERIAL EXHIBITING VIEWING-ANGLE DEPENDENT COLOR AND COMPRISING A PLURALITY OF DISCRETE EXTENDED ELEMENTS

CROSS REFERENCE TO RELATED APPLICATION

This application claims the benefit of U.S. Provisional Application No. 61/159,906, filed Mar. 13, 2009.

FIELD OF THE INVENTION

The present invention relates to a colored web exhibiting viewing-angle dependent color and comprising a plurality of discrete extended elements.

BACKGROUND OF THE INVENTION

Web materials, such as thermoplastic films, have a variety of uses including component materials of absorbent articles (such as topsheets and backsheets), packaging (such as flow wrap, shrink wrap, and polybags), trash bags, food wrap, dental floss, wipes, electronic components, and the like. For many of these uses of web materials, it can be beneficial for the web material to have aesthetically pleasing features such as desirable feel, visual impression, and/or audible impression.

Web materials have been made more aesthetically pleasing by adding colorants, by either incorporating directly into the web material or by printing onto the surface of the web material, to create aesthetically pleasing graphics to improve the appearance of the web material. However, this approach typically does not improve the feel or sound characteristics of the web material.

Other web materials have been processed to add microtexture to the web material, which can improve the feel of the web material and/or reduce the glossiness of the web material.

Despite the knowledge in the art, there remains a desire to develop a more aesthetically pleasing web material having desirable feel, visual impression, and/or audible impression, especially webs comprising a plurality of discrete extended elements exhibiting thinning in desirable areas of the web.

SUMMARY OF THE INVENTION

The present invention relates to a colored web material exhibiting viewing-angle dependent color and comprising a plurality of discrete extended elements to provide desirable aesthetics such as feel, visual impression and/or audible impression.

In one embodiment, the present invention encompasses a multi-layer colored web material exhibiting viewing-angle dependent color and comprising a first web material and a second web material, wherein the first web material comprises a first polymer having first refractive properties and the second web material comprises a second polymer having second refractive properties. The first refractive properties of the first polymer are different than the second refractive properties of the second polymer. The multi-layer web further comprises a plurality of discrete extended elements that comprise open proximal ends, open or closed distal ends, and sidewalls. The discrete extended elements optionally comprise thinned portions at the distal ends of the discrete extended elements and/or along the sidewalls of the discrete extended elements. In one embodiment, the discrete extended elements have a diameter of less than about 500 microns. In one embodiment, the multi-layer web comprises at least about 95 discrete extended elements per square centimeter. In one embodiment, the discrete extended elements have an aspect ratio of at least about 0.2.

In another embodiment, the present invention encompasses a colored web material exhibiting viewing-angle dependent color and comprising a plurality of discrete extended elements and an interference pigment in at least one layer of the colored web material. The discrete extended elements comprise open proximal ends, open or closed distal ends, and sidewalls. The discrete extended elements optionally comprise thinned portions at the distal ends of the discrete extended elements and/or along the sidewalls of the discrete extended elements. In one embodiment, the discrete extended elements have a diameter of less than about 500 microns. In one embodiment, the multi-layer web comprises at least about 95 discrete extended elements per square centimeter. In one embodiment, the discrete extended elements have an aspect ratio of at least about 0.2.

BRIEF DESCRIPTION OF THE DRAWINGS

The patent or application file contains at least one drawing or photograph executed in color. Copies of this patent or patent application publication with color drawing(s) or color photograph(s) will be provided by the Office upon request and payment of the necessary fee.

FIG. 7A is a top view of an unstretched iridescent film precursor web of the present invention.

FIG. 7B is a top view of a stretched iridescent film precursor web of the present invention.

FIG. 8A is a photomicrograph showing a cross-sectional view of a portion of the unstretched iridescent film precursor web of FIG. 7A.

FIG. 8B is a photomicrograph showing a cross-sectional view of a portion of the stretched iridescent film precursor web of FIG. 7B.

DETAILED DESCRIPTION OF THE INVENTION

Figure 1:
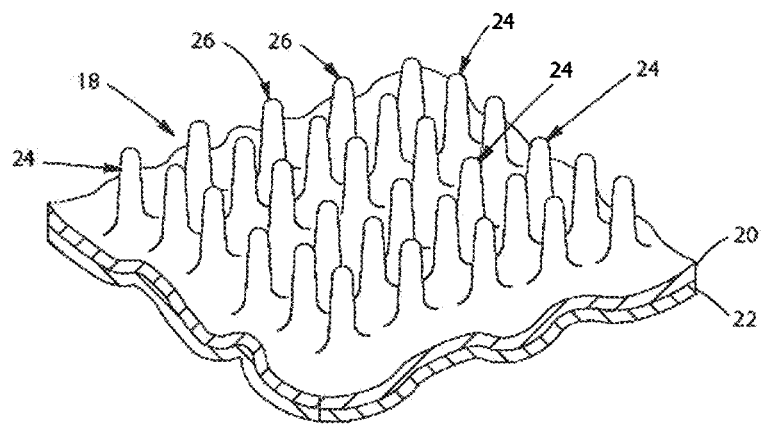
FIG. 1 is a perspective view of a portion of a colored web material of the present invention.

The present invention encompasses a colored web exhibiting viewing-angle dependent color and comprising a plurality of discrete extended elements. The present invention further encompasses a multi-layered web material comprising a plurality of discrete extended elements, wherein the layers of the web material are made of polymers having different refractive properties. The present invention further encompasses a web material and comprising a plurality of discrete extended elements, wherein the web material comprises an interference pigment incorporated in at least one layer of the web material.

Colored Web Exhibiting Viewing-Angle Dependent Color and Comprising a Plurality of Discrete Extended Elements The colored web materials of the present invention are made from precursor web materials that are manipulated according to the processes described hereinbelow to form the colored web materials of the present invention.

The colored web materials of the present invention can comprise a single layer web material or a multi-layer web material.

In one embodiment, the web of the present invention comprises a multi-layer web, wherein a first layer comprises a polymer having first refractive properties and a second layer comprises a polymer having second refractive properties, wherein the first and second refractive properties are different. Such multi-layer web materials can comprise hundreds of layers.

In one embodiment, the web of the present invention comprises an interference pigment in at least one layer of the colored web.

A precursor web is processed to form a three-dimensional colored web that can have various desired structural features and properties such as desired soft hand feel and an aesthetically pleasing visual appearance. A variety of processes can be utilized to form the colored web of the present invention, as described below.

In one embodiment, the web resulting from the process described herein can comprise extended elements similar to those described in detail in U.S. Pat. Nos. 7,402,723 and 7,521,588.

The colored web materials of the present invention will typically comprise discrete extended elements that comprise open proximal ends and open or closed distal ends. The discrete extended elements can optionally exhibit thinning at the distal ends of the discrete extended elements and/or along the sidewalls of the discrete extended elements. For multi-layer precursor webs, the thinning of the colored web material at the distal ends and/or along the sidewalls of the discrete extended elements enables the color of the bottom layer of the web to become more visible through the top layer, and the color of the top layer to become more visible through the bottom layer, in the areas of the web that have been thinned. For mono-layer precursor webs comprising colorant on at least one surface of the precursor web, the thinning of the colored web material at the distal ends and/or along the sidewalls of the discrete extended elements enables the colorant that is disposed on the surface of the precursor web to be also thinned or fractured such that the color of the mono-layer of the precursor web becomes more visible in the areas of the web in which the colorant has been thinned or fractured. This can provide a contrast in visual aesthetics of the colored web that highlights the particular pattern formed in the colored web by the discrete extended elements and can create aesthetically pleasing web materials.

Thinning of the discrete extended elements of a multi-layer web material comprising layers made of polymers having different refractive indices can result in altering the refractive properties of each layer in the thinned areas, which alters the visual impression of the web and can serve to highlight the pattern(s) created by the discrete extended elements. In addition, the three-dimensional topography creates different apparent colors of the extended elements due to the angle-dependent nature of such multi-layer web materials. Therefore, even in the absence of thinning at the distal ends and/or along the sidewalls of the extended elements, the three-dimensional topography resulting from the extended elements can cause the visual effect of an apparent color change.

In certain embodiments of multi-layer webs, the underlying layer (e.g. bottom layer) does not extend through the overlying layer (e.g. top layer). In this respect, the overlying/top layer is not disrupted or broken, and remains continuous, especially in embodiments wherein the distal ends of the discrete extended elements are closed.

FIG. 1 is a partial view of one embodiment of a three-dimensional colored web 18. The three-dimensional colored web 18 is produced from a precursor web, which can be a single layer of web material or a multilayer co-extruded or laminate web material as described hereinafter. As shown in FIG. 1, the precursor web is a two layer laminate film comprising a first layer 20 and a second layer 22. One or both layers of the multi-layer web material can comprise a colorant. Multi-layer film materials may be co-extruded, as is known in the art for making laminate films, including films comprising skin layers.

FIG. 1 further shows that the colored web 18 comprises a plurality of discrete extended elements 24. The discrete extended elements 24 are formed as protruded extensions of the web, generally on a first surface thereof. Depending upon the forming structure used to form the colored web, the discrete extended elements may extend from both surfaces of the web. The number, size, and distribution of discrete extended elements 24 on the colored web 18 can be predetermined based on desired soft feel, sound effects and visual effects.

For applications such as a topsheet, backsheet or release paper wrapper in disposable absorbent articles, or packaging, it can be desired that the discrete extended elements 24 protrude only from one surface of the colored web 18. Therefore, when the colored web 18 is used as a topsheet in a disposable absorbent article, the colored web 18 can be oriented such that the discrete extended elements 24 are skin contacting for superior softness impression. Moreover, having discrete extended elements 24 with closed distal ends 26 can result in reduced rewet, i.e., reduced amounts of fluid being re-introduced to the surface of the topsheet after having been first passed through apertures of the topsheet to underlying absorbent layers (note that apertures, such as macroapertures, are not shown in the Figures herein).

Figure 2:
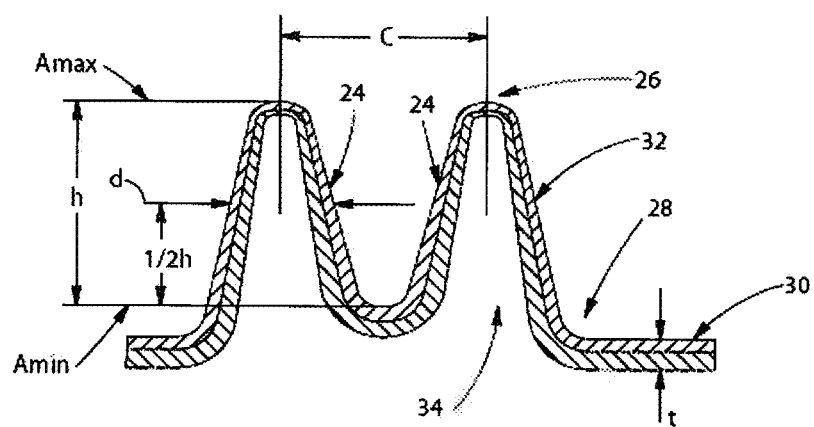
FIG. 2 is a cross-sectional view of a portion of a colored web material of the present invention.

FIG. 2 is a cross-sectional view of a portion of one embodiment of a colored web 18 of the present invention. As shown in FIG. 2, discrete extended elements 24 can be described as protruding from first surface 28 of the colored web 18. As such, the discrete extended elements 24 can be described as being integral with precursor web 30, and formed by permanent local plastic deformation of the precursor web 30. The discrete extended elements 24 can be described as having a side wall(s) 32 defining an open proximal portion 34 and a closed or open distal end 26. The discrete extended elements 24 each have a height h measured from a minimum amplitude $A_{min}$ between adjacent extended elements to a maximum amplitude $A_{max}$ at the closed or open distal end 26. The discrete extended elements have a diameter d, which for a generally cylindrical structure is the outside diameter at a lateral cross-section. By "lateral" is meant generally parallel to the plane of the first surface 28. For generally columnar discrete extended elements having non-uniform lateral cross-sections, and/or non-cylindrical structures of discrete extended elements, diameter d is measured as the average lateral cross-sectional dimension at ½ the height h of the discrete extended element, as shown in FIG. 2. Thus, for each discrete extended element 24, an aspect ratio, defined as h/d, can be determined. The discrete extended element 24 can have an aspect ratio h/d of at least about 0.2, at least about 0.3, at least about 0.5, at least about 0.75, at least about 1, at least about 1.5, or at least about 2. The discrete extended elements 24 will typically have a height h of at least about 30 microns, at least about 50 microns, at least about 65 microns, at least about 80 microns, at least about 100 microns, at least about 120 microns, at least about 150 microns, or at least about 200 microns. The discrete extended elements 24 will typically have a diameter d of from about 50 microns to about 5,000 microns, about 50 microns to about 3,000 microns, about 50 microns to about 500 microns, about 65 microns to about 65 microns to about 300 microns, or about 75 microns to about 200 microns. In one embodiment, the discrete protruded elements 15 of the forming structure 10 will have a diameter of less than about 500 microns.

For discrete extended elements that have generally non-columnar or irregular shapes, a diameter of the discrete extended element can be defined as two times the radius of gyration of the discrete extended element at ½ height.

Figure 3:
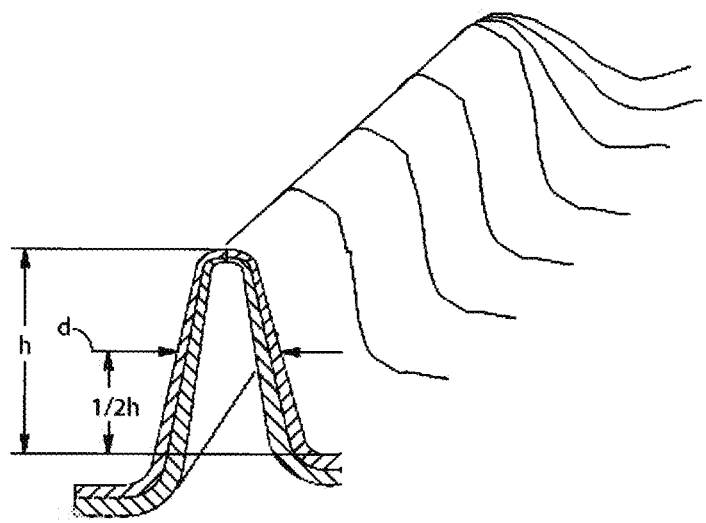
FIG. 3 is a perspective view of a portion of a colored web material of the present invention.

For discrete extended elements that have shapes, such as ridges, that extend lengthwise across the entire web material such that the extended elements have a portion of the sidewalls of the extended elements that are open, a diameter of a discrete extended element can be defined as the average minimal width between two opposing sidewalls of the extended element at ½ height. FIG. 3 illustrates a colored web comprising a discrete extended element that is in the shape of a ridge, the discrete extended element having a diameter d measured at ½ height h.

In general, because the actual height h of any individual discrete extended element 24 can be difficult to determine, and because the actual height may vary, an average height $h_{avg}$ of a plurality of discrete extended elements can be determined by determining an average minimum amplitude $A_{min}$ and an average maximum amplitude $A_{max}$ over a predetermined area of the colored web 18. Such average height $hp_{avg}$ will typically fall within the ranges of heights described above. Likewise, for varying cross-sectional dimensions, an average diameter $d_{avg}$ can be determined for a plurality of discrete extended elements 24. Such average diameter $d_{avg}$ will typically fall within the ranges of diameters described above. Such amplitude and other dimensional measurements can be made by any method known in the art, such as by computer aided scanning microscopy and data processing. Therefore, an average aspect ratio $AR_{avg}$ of the discrete extended elements 24 for a predetermined portion of the colored web 18 can be expressed as $h_{avg}/d_{avg}$.

In certain embodiments, the heights of the discrete extended elements can be varied to create different colors or hues as described hereinbelow. For example, discrete extended elements can have heights that gradually increase or decrease as compared to adjacent extended elements, which can create smooth color gradients. Alternatively, adjacent extended elements, or adjacent regions of extended elements, can vary more drastically in height, which can create more drastic differences in color appearance.

In one embodiment, the diameter of a discrete extended element 24 is constant or decreases with increasing amplitude (amplitude increases to a maximum at closed or open distal end 26). As shown in FIG. 2, for example, the diameter, or average lateral cross-sectional dimension, of the discrete extended elements 24 can be a maximum at proximal portion 34 and the lateral cross-sectional dimension steadily decreases to distal end 26.

In one embodiment, the discrete extended elements can be discrete mushroom-shaped surface aberrations such as those described in U.S. Pat. No. 4,846,821.

As shown in FIG. 2, the optional thinning of the precursor web 30 occurs due to the relatively deep drawing required to form high aspect ratio discrete extended elements 24. For example, thinning can be observed at the closed or open distal ends 26 and/or along the sidewalls 32. By "observed" is meant that the thinning is distinct when viewed in magnified cross-section.

Such thinning, though optional, can be beneficial from a softness standpoint as the thinned portions offer little resistance to compression or shear when touched. For example, when a person touches the colored web 18 on the side exhibiting discrete extended elements 24, the fingertips of the person first contact the closed or open distal ends 26 of the discrete extended elements 24. Due to the high aspect ratio of the discrete extended elements 24, and the wall thinning of the precursor web 30 at or near the distal ends 26, the discrete extended elements 24 offer little resistance to the compression or shear imposed on the colored web by the person's fingers. This lack of resistance relates to a feeling of softness, much like the feeling of a velour fabric.

Such thinning, though optional, can also be beneficial from a visual impression standpoint, as the thinned areas can provide a visual impression that is distinct from areas that are not thinned. For example, if the precursor web of the present invention is a two layer web wherein the top layer and the bottom layer each comprise a different colorant and therefore exhibit a different color, thinning allows the color of the bottom layer to become more visible when viewing the top surface of the colored web. For example, this can lighten or darken the discrete extended elements if the bottom layer is white or black, respectively. Alternatively, it can create a new, different color of the extended elements, e.g., a bilayer precursor film comprising a blue top layer plus a yellow bottom layer can create green extended elements, or combinations of colors, depending on the degree of thinning in different regions. A color change is affected on both the exterior and interior of the extended element in the thinned area. If the precursor web is a multi-layer web with different refractive indices in alternating layers, e.g. an iridescent film, the thinning can cause a blue-shift, or perhaps even turn a colored precursor web into a web with colorless extended elements. This can be important in providing unique visual effects which can highlight the pattern created by the discrete extended elements of the colored web.

The optional thinning of the precursor web at the closed or open distal ends 26 and/or along the sidewalls 32 can be measured relative to the thickness of the precursor web or relative to the thickness of the land area that completely surrounds the discrete extended elements of the colored web. The precursor web will typically exhibit thinning of at least about 25%, at least about 50%, or at least about 75% relative to the thickness of the precursor web. The precursor web will typically exhibit thinning of at least about 25%, at least about 50%, or at least about 75% relative to the thickness of the land area surrounding the discrete extended elements of the colored web.

It should be noted that a fluid impermeable web having only the discrete extended elements as disclosed herein, and not having macroscopic apertures or discrete extended elements having open distal ends, can offer softness for any application in which fluid permeability is not required. Open distal ends can also be desirable, for example, in applications requiring venting or the passage of air or liquid, such as vented packaging applications. Thus, in one embodiment of the present invention, the invention can be described as a colored web exhibiting a soft and silky tactile impression on at least one surface thereof, the silky feeling surface of the colored web exhibiting a pattern of discrete extended elements, each of the discrete extended elements being a protruded extension of the web surface and having a side wall defining an open proximal portion and a closed or open distal end, the discrete extended elements having a maximum lateral cross-sectional dimension at or near the open proximal portion.

The colored web of the present invention can also exhibit improved sound effects. For example, when handled or manually manipulated, the colored web creates less sound as compared to the precursor web.

The "area density" of the discrete extended elements, which is the number of discrete extended elements per unit area of first surface, can be optimized and the colored web will typically comprise from about 4 to about 10,000, from about 95 to about 10,000, from about 240 to about 10,000, from about 350 to about 10,000, from about 500 to about 5,000, or from about 700 to about 3,000 discrete extended elements per square centimeter. With respect to determining the number of discrete extended elements in a given area, if the sample area includes only a portion of a particular discrete extended element, that particular discrete extended element is included in the count of discrete extended elements within the given area.

In general, the center-to-center spacing can be optimized for adequate tactile impression, to minimize fluid retention (if desired), or to entrap substances (if desired). The center-to-center spacing between adjacent discrete extended elements can be from about 100 microns to about 5,000 microns, from about 100 microns to about 1,020 microns, from about 100 microns to about 640 microns, from about 150 microns to about 500 microns, or from about 180 microns to about 430 microns.

Figure 4:
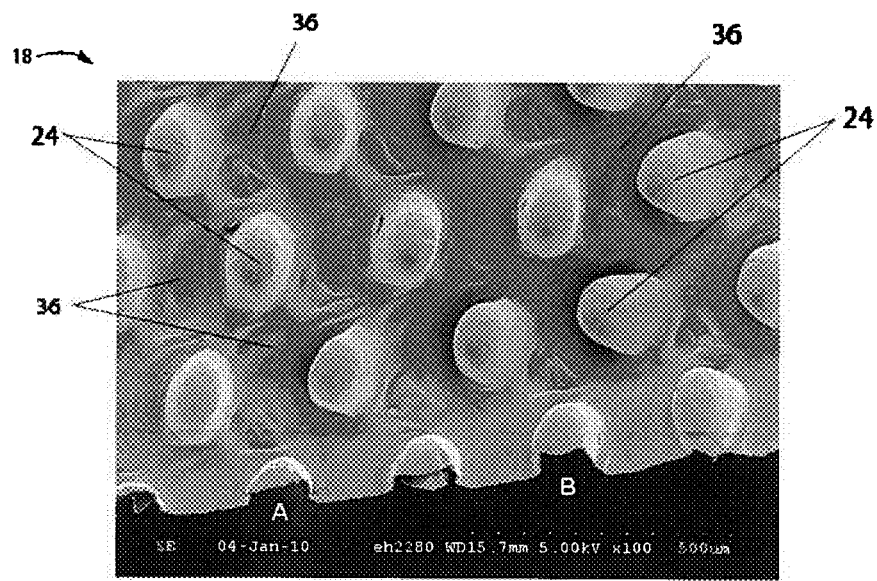
FIG. 4 is a photomicrograph showing a top view of a colored web material web of the present invention.

FIG. 4 is a photomicrograph of a top view of one embodiment of a colored web 18 of the present invention comprising a plurality of discrete extended elements 24 completely surrounded by land areas 36.

Figure 5:
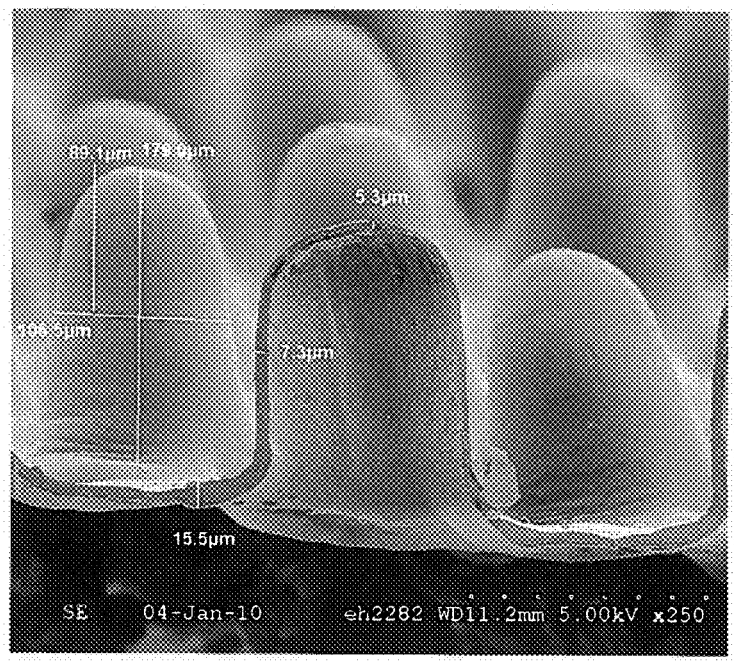
FIG. 5 is a photomicrograph showing a cross-sectional view of a portion of a colored web material of the present invention.

FIG. 5 is a photomicrograph of a cross-sectional view of one embodiment of a colored web of the present invention which includes a cross-sectional view of a discrete extended element of the colored web.

Figure 6:
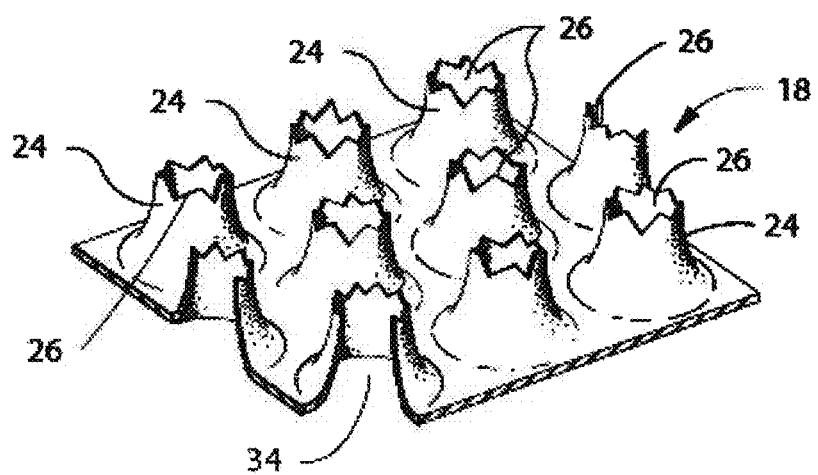
FIG. 6 is a perspective view of a portion of a colored web material of the present invention.

FIG. 6 illustrates one embodiment of a colored web 18 of the present invention comprising a plurality of discrete extended elements 24, wherein the discrete extended elements 24 have open distal ends 26 and open proximal portions 34.

When the colored or translucent web can further comprise larger apertures that allow, for example, fluid to flow through the colored or translucent web. Sizes of such larger apertures can range from about 0.5 square mm to about 5 square mm. Examples of suitable macroapertures are described in detail in US 2008/0138574 A1 and U.S. Pat. No. 7,521,588 at col. 7, lines 11-47 and FIG. 6.

Precursor Web

The colored web material comprising a plurality of discrete extended elements of the present invention can be produced from a variety of precursor web materials. A precursor web is converted into a colored web comprising a plurality of extended elements, preferably utilizing a process as described hereinbelow. Suitable precursor webs include materials that can be deformed by pressure applied against the precursor web and a forming structure, such that the precursor web is able to be conformed to, with or without rupture, the topography of the forming structure to produce a colored web of the present invention.

The precursor web of the present invention typically comprises synthetic material, metallic material, biological material (in particular, animal-derived materials), or combinations thereof. The precursor web can optionally comprise cellulosic material. In one embodiment, the precursor web is free of cellulosic material. Non-limiting examples of suitable precursor webs include polymeric films, metallic foils (e.g. aluminum, brass, copper, and the like), webs comprising sustainable polymers, foams, fibrous nonwoven webs comprising synthetic fibers (e.g. TYVEK®), collagen films, chitosan films, rayon, cellophane, and the like. Suitable precursor webs further include laminates or blends of these materials.

If the precursor is a fibrous web, the fibrous web typically will have a high density such that it behaves similar to a film material. One example of such a high density fibrous web is TYVEK®.

In one embodiment, the precursor web is a polymeric film. Suitable polymeric films include thermoplastic films such as polyethylene, polypropylene, polystyrene, polyethylene terephthalate (PET), polymethylmethacrylate (PMMA), polyvinyl alcohol (PVA), nylon, polytetrafluoroethylene (PTFE) (e.g., TEFLON), or combinations thereof. Suitable polyermic films can comprise blends or mixtures of polymers.

In certain embodiments, the precursor web can be a web comprising a sustainable polymer, such as polylactides, polyglycolides, polyhydroxyalkanoates, polysaccharides, polycaprolactones, and the like, or mixtures thereof.

The thickness of the precursor web, prior to processing into the colored web material of the present invention, will typically range from about 5 microns to about 150 microns, from about 8 microns to about 100 microns, or from about 10 microns to about 80 microns.

Optionally, the precursor web may be plasticized to decrease modulus and/or make it less brittle prior to processing into the colored web of the present invention.

In one embodiment, the precursor web is strain hardening. The strain hardening properties of the precursor web can be desirable to facilitate conformation of the precursor web to the discrete protruded elements of the forming structure in the process of the present invention. This can be preferred for producing colored webs wherein closed distal ends of the extended elements of the colored web are desired.

The precursor web can be any material, such as a polymeric film, having sufficient material properties to be formed into a colored web described herein by the embossing process of the present invention. The precursor web will typically have a yield point and the precursor web is preferably stretched beyond its yield point by the process of the present invention to form a colored web. That is, the precursor web should have sufficient yield properties such that the precursor web can be strained without rupture to an extent to produce the desired discrete extended elements with closed distal ends or, in the case of a colored web comprising discrete extended elements having open distal ends, rupture to form open distal ends. As disclosed below, process conditions such as temperature and strain rate can be varied for a given polymer to permit it to stretch with or without rupture to form the colored web of the present invention comprising desired discrete extended elements. In some embodiments, therefore, it has been found that preferred starting materials to be used as the precursor web for producing the web of the present invention exhibit low yield and high-elongation characteristics. In addition, as discussed previously, the precursor webs preferably strain harden. Examples of films suitable for use as the precursor web in the process of the present invention include films comprising low density polyethylene (LDPE), linear low-density polyethylene (LLDPE), polypropylene, and blends of linear low-density polyethylene and low density polyethylene (LLDPE/LDPE).

The precursor web must also be sufficiently deformable and have sufficient ductility for use as a precursor web of the present invention. The term "deformable" as used herein describes a material which, when stretched beyond its elastic limit, will substantially retain its newly formed conformation, as well as exhibit thinning at or near the distal ends of the discrete extended elements of the resulting colored web.

One material found suitable for use as a precursor web of the present invention is DOWLEX 2045A polyethylene resin, available from The Dow Chemical Company, Midland, Mich., USA. A film of this material having a thickness of 20 microns can have a tensile yield of at least 12 MPa; an ultimate tensile of at least 53 MPa; an ultimate elongation of at least 635%; and a tensile modulus (2% Secant) of at least 210 MPa (each of the above measures determined according to ASTM D 882). Other suitable precursor webs include polyethylene film that is about 25 microns (1.0 mil) thick and has a basis weight of about 24 grams per square meter ("gsm") available from available from RKW US and polyethylene/polypropylene film having a basis weight of about 14 gsm and a thickness of about 15 microns available from RKW US.

The precursor web can be a laminate of two or more webs, and can be a co-extruded laminate. For example, precursor web can comprise two layers, and precursor web can comprise three layers, wherein the innermost layer is referred to as a core layer, and the two outermost layers are referred to as skin layers. In one embodiment, the precursor web comprises a three layer co-extruded laminate having an overall thickness of about 25 microns (0.001 in.), with the core layer having a thickness of about 18 microns (0.0007 in.); and each skin layer having a thickness of about 3.5 microns (0.00015 in.). The thickness of precursor web can be about 15 microns, 20 microns, 25 microns, 30 microns, 35 microns, 40 microns, 45 microns, or 60 microns. In one embodiment, the layers can comprise polymers having different stress-strain and/or elastic properties.

The precursor web can be made using conventional procedures for producing multilayer films on conventional co-extruded film-making equipment. Where layers comprising blends are required, pellets of the above described components can be first dry blended and then melt mixed in the extruder feeding that layer. Alternatively, if insufficient mixing occurs in the extruder, the pellets can be first dry blended and then melt mixed in a pre-compounding extruder followed by repelletization prior to film extrusion. Suitable methods for making precursor web are disclosed in U.S. Pat. Nos. 5,520,875 and 6,228,462.

In general, the ability to form high area density (or low average center-to-center spacing or low average edge-to-edge spacing) discrete extended elements on the colored web can be limited by the thickness of precursor web. For example, in one embodiment, it is believed that the edge-to-edge spacing of two adjacent discrete protruded elements of a forming structure should be greater than about twice the thickness of precursor web to permit adequate and complete three-dimensional colored web formation between adjacent discrete protruded elements of the forming structure. In addition, in one embodiment, a ratio of the average height of the plurality of discrete protruded elements of the forming structure and the thickness of the precursor web will typically be at least about 2:1, at least about 3:1, at least about 4:1, or at least about 5:1. Similarly, if a forming structure with depression or apertures is used to make a colored web of the present invention, the aperture diameter must be more than twice the thickness of the precursor web to allow it to be conformed into the depression or aperture to form the three-dimensional colored web.

In certain embodiments, the precursor web can optionally further comprise a surfactant. If utilized, preferred surfactants include those from non-ionic families such as: alcohol ethoxylates, alkylphenol ethoxylates, carboxylic acid esters, glycerol esters, polyoxyethylene esters of fatty acids, polyoxyethylene esters of aliphatic carboxylic acids related to abietic acid, anhydrosorbitol esters, etyhoxylated anhydrosorbitol esters, ethoxylated natural fats, oils, and waxes, glycol esters of fatty acids, carboxylic amides, diethanolamine condensates, and polyalkyleneoxide block copolymers. Molecular weights of surfactants selected for the present invention may range from about 200 grams per mole to about 10,000 grams per mole. Preferred surfactants have a molecular weight from about 300 to about 1,000 grams per mole.

If utilized, the surfactant level initially blended into precursor web can be as much as 10 percent by weight of the total precursor web. Surfactants in the preferred molecular weight range (300-1,000 grams/mole) can be added at lower levels, generally at or below about 5 weight percent of the total precursor web.

Other additives, such as particulate skin treatments or protectants, or odor-absorbing actives, e.g., zeolites, can optionally be added in one or more layers of precursor web. In some embodiments, colored webs comprising particulate matter, when used in skin-contacting applications, can permit actives to contact the skin in a very direct and efficient manner. Specifically, in some embodiments, formation of discrete extended elements can expose particulate matter at or near the distal ends thereof. Therefore, actives such as skin care agents can be localized at or near distal ends of the discrete extended elements to permit direct skin contact with such skin care agents when the colored web is used in skin contacting applications.

Iridescent films can also be suitable precursor webs for the colored web materials of the present invention. Iridescent films are typically multi-layer films that comprise a first layer comprising a first polymer having a first refractive index and a second layer comprising a second polymer having a second refractive index. The different refractive indices of the different polymers in each layer generate an iridescence effect. Some iridescent films comprise over a hundred layers, each layer being only nanometers in thickness. Such iridescent films are described in detail in U.S. Pat. Nos. 3,711,176 and 5,451,449. Suitable commercially-available iridescent films are commercially-available from BASF under the tradename AURORA® Special Effect Films.

Iridescent films utilized as a precursor web to produce a colored web of the present invention have unique properties that can provide especially interesting visual effects. The refractive properties of each polymer in each layer and the thickness of each layer of the iridescent film will determine the wavelength of the light reflected by the iridescent film, and therefore the film exhibit varying colors. Upon processing the iridescent film to form a colored web of the present invention, the extended elements of the colored web will tend to exhibit a different color and/or visual effect due to the three-dimensional topography and/or thinning of the film at the distal ends and/or along the sidewalls of the extended elements of the colored web of the present invention.

In one embodiment, the iridescent film can comprise a layer of air (e.g. a void space within the precursor web material). Such web materials can mimic the structure found naturally in butterfly wings, in which a layer of air within the wing structure provides the difference in refractive properties sufficient to impart an iridescent appearance to the web material.

Because the color of iridescent films is angle-dependent, the three-dimensional topography of the extended elements, even with little or no thinning (e.g. less than about 25%) of the film layer(s), take on a different visible color than the precursor web and the land areas around the discrete extended elements.

As mentioned, the visual appearance of iridescent precursor webs can be manipulated by the degree of thinning imparted to the web, such as when forming the extended elements of the colored webs the present invention. When an iridescent film comprises layers having thicknesses and refractive properties such that the pathlength of reflected light falls within the range of from about 370 nm to about 770 nm (i.e. the visible light range), the film will exhibit a perceived color. The reflected colors that will be enhanced will have wavelengths up to about twice that of the layer thicknesses. The path length the light takes through the web will be viewing angle dependent. If viewed from directly overhead (i.e. 90 degrees), the path length will be shortest and about twice the layer thicknesses. If viewed from angles of less than 90 degrees, the path length will be longer. It is therefore possible to manipulate the perceived color within a given area of the web by altering the thickness of the given area of the web. Forming the thinned extended elements of colored web of the present invention imparts a perceived color change in the areas of extended elements. The degree of the change can be dependent upon the degree of thinning of the web.

FIGS. 7A and 7B illustrate the effect of thinning on a particular iridescent film web, Aurora Special Effect Film IF 4781 Red Green 56. The unstretched iridescent film web exhibits a green color when in front of a dark colored background and a red color when in front of a light colored background. The iridescent film web of FIG. 7A is shown in an unstretched state against a dark colored background. The film web of FIG. 7A is then stretched by pulling a 25.4 mm wide, 25.4 mm long sample in a tensile tester at 2 mm/s. As shown in FIG. 7B, the stretched iridescent film web exhibits a first region that is not thinned, a second region that is somewhat thinned, and a third region that is thinned even more. The first region possesses the same color as the unstretched film of FIG. 7A. The second region is thinned enough to cause a blue-shift of the visible reflected light relative to the unstretched film. The third region has been thinned so much that it is colorless in the area that has been sufficiently stretched. This is a result of the iridescent film web being thinned such that the reflected light falls outside the visible light range. That is, the layer thicknesses are less than half of the shortest visible light wavelengths.

The differences in thickness are further illustrated by the cross-sectional photomicrograph images shown in FIG. 8A (unstretched area exhibiting a green color) and 8B (stretched area exhibiting a colorless appearance). FIG. 8A is a cross-sectional photomicrograph image of the unstretched colored region of the film shown in FIG. 7A, having individual layers that are about 150 nanometers thick. FIG. 8B is a cross-sectional photomicrograph image of the stretched, colorless third region of FIG. 7B, having individual layers that are about 80 nanometers thick.

In another embodiment, the iridescent precursor web can have unstretched layer thicknesses that are more than twice the longest visible light wavelengths. In this case, the film web is initially colorless. Such a film web can be stretched to thin the layers to such a thickness to be iridescent to visible light wavelengths such as when forming the extended elements of the colored webs the present invention. The film web would then become colored only in the thinned areas.

In one embodiment of an iridescent precursor web, the precursor web comprises outer layers made of polyethylene. This can provide a colored web of the present invention that can tend to exhibit a softer hand feel and be quieter as compared to iridescent precursor webs that do not have polyethylene outer layers.

The precursor web can also optionally comprise fillers, plasticizers, and the like.

Interference Pigment

Interference pigments are typically particles comprising two or more layers of controlled thickness with different refractive indices. Interference pigments can yield a characteristic reflected color from the interference of typically two, but occasionally more, light reflections, from different layers of the particle, which may be thin and plate-like. Non-limiting examples of suitable interference pigments for the present invention comprise a base substrate particle comprised of natural or synthetic mica, borosilicate glass, silica, or mixtures thereof, layered with films of $TiO_2$, silica, tin oxide, iron oxide, or mixtures thereof, wherein the thickness of the layers is typically from about 50 nm to about 300 nm. In one embodiment, the interference pigments are substantially colorless when viewed macroscopically in bulk powder form, and the film layer is $TiO_2$.

Suitable interference pigments are commercially available from a wide variety of suppliers, for example, Rona (Timiron™), Sensient (Covapearl™), Englehard (Flamenco™) Kobo (KTZ Interval™ and Interfine™) and Eckart (Prestige™). In one embodiment, the interference pigments have an average diameter of individual particles in the longest direction of from about 5 microns to about 150 microns, alternatively from about 5 microns to about 25 microns, and alternatively from about 10 to about 20 microns.

Optionally, the colored web of the present invention can further comprise colorant in addition to interference pigments. As used herein, the term "colorant" generally refers to a pigment, lake, toner, dye or other agent used to impart a color to a material.

The colored web materials of the present invention can optionally further comprise a colorant, other than an interference pigment, that is incorporated into the web material itself (e.g. co-extruded) or coated onto at least one surface of the web material.

Non-limiting examples of suitable pigments include talc, magnesium carbonate, calcium carbonate, magnesium silicate, aluminum magnesium silicate, silica, titanium dioxide, zinc oxide, red iron oxide, yellow iron oxide, black iron oxide, carbon black, ultramarine, polyethylene powder, methacrylate powder, polystyrene powder, silk powder, crystalline cellulose, starch, bismuth oxychloride, and the like.

Some of the colorants which can be used herein include, but are not limited to, D&C Yellow No. 7, D&C Red No. 36, FD&C Red No. 3, FD&C Red No. 4, D&C Orange No. 4, D&C Red No. 6, D&C Red No. 34, FD&C Yellow No. 6, D&C Red No. 33, FD&C Yellow No. 5, D&C Brown No. 1, D&C Red No. 17, FD&C Green No. 3, D&C Blue No. 4, D&C Yellow No. 8, D&C Orange No. 5, D&C Red No. 22, D&C Red No. 21, D&C Red No. 28, D&C Orange No. 11, D&C Yellow No. 10, D&C Violet No. 2, Ext. D&C Violet No. 2, D&C Green No. 6, D&C Green No. 5, D&C Red No. 30, D&C Green No. 8, D&C Red No. 7, FD&C Blue No. 1, D&C Yellow No. 7, D&C Red No. 27, D&C Orange No. 10, D&C Red No. 31, FD&C Red No. 40, D&C Yellow No. 11, Aimatto extract, pi carotene, guanine, carmine, aluminum powder, ultramarines, bismuth oxychloride (such as those commercially available from BASF under the tradename Mearlite™), chromium oxide green, chromium hydroxide green, iron oxides, ferric ferrocyanide, manganese violet, titanium dioxide, zinc oxide, caramel coloring, ferric ammonium ferrocyanide, dihydroxyacetone, guaiazulene, pyrophyllite, bronze powder, copper powder, aluminum stearate, calcium stearate, lactofavin, magnesium stearate, zinc stearate, capsanthin/capsorubin, bentonite, barium sulfate, calcium carbonate, calcium sulfate, carbon black, magnesium carbonate, colored silica, brown dyes, Russet dyes, Sienna dyes, and the like. Other suitable colorants include metallic inks, such as those referred to as leafing metallic flake inks and non-leafing metallic flake inks.

Lakes are either a pigment that is extended or reduced with a solid diluent or an organic pigment that is prepared by the precipitation of a water-soluble dye on an adsorptive surface, which usually is aluminum hydrate. There is uncertainty in some instances as to whether the soluble dye precipitates on the surface of the aluminum hydrate to yield a dyed inorganic pigment or whether it merely precipitates in the presence of the substrate. A lake also forms from precipitation of an insoluble salt from an acid or basic dye. Calcium and barium lakes are also used herein.

Depending upon the desired visual effects, in selecting a colorant for application to the surface of a precursor web of the present invention, a flexible ink or inflexible ink can be utilized. An inflexible ink will tend to break apart in the area of the extended elements upon formation of the colored web of the present invention. This will tend to result in the color of the web underlying the applied colorant to be highlighted in the area of the extended elements.

In other applications where this effect is not desirable, a flexible ink can be utilized which may thin, but not break apart, in the area of the extended elements upon formation of the colored web of the present invention. Flexible inks include those commercially available from Sun Chemical (5020 Spring Grove Avenue, Cincinnati, Ohio 45232).

In one embodiment, one of the layers of a multi-layer web of the present invention will have a black color. A black colored layer is typically combined with another layer having a different color. The black colored layer can act as a background to highlight the three dimensional pattern imparted to the precursor web according to the present invention, especially as the extended elements of the web material of the present invention exhibit wall thinning at or near the distal ends of the extended elements (the distal ends of the extended elements may be closed or open). To provide a black colored layer, the layer will typically comprise a pigment selected from the group consisting of iron oxide, carbon black, and the like, and mixtures thereof. In one embodiment, a layer of the multi-layer web comprises carbon black. The level of pigment in the black colored layer may be from about 0.5% to about 50%, from about 1% to about 30%, or from about 2% to about 20%, by weight of the black colored layer. Examples 1 and 2 described hereinbelow illustrate this type of multi-layer web.

In one embodiment, one of the layers of a multi-layer web of the present invention will have a white color. A white colored layer is typically combined with another layer having a different color. The white colored layer can act as a background to highlight the three dimensional pattern imparted to the precursor web according to the present invention, especially as the extended elements of the web material of the present invention exhibit wall thinning at or near the distal ends of the extended elements (the distal ends of the extended elements may be closed or open). To provide a white colored layer, the layer will typically comprise a pigment selected from the group consisting of titanium dioxide, calcium carbonate, talc, and the like. In one embodiment, a layer of the multi-layer web comprises titanium dioxide. The level of pigment in the white colored layer may be from about 0.5% to about 20%, from about 1% to about 10%, or from about 2% to about 6%, by weight of the white colored layer. Example 3 described hereinbelow illustrates this type of multi-layer web. Other materials that are immiscible in the polymer of the film can also be used to create an opaque, such as polylactic acid (in polyethylene polymer film).

In one embodiment, one of the layers of a multi-layer web of the present invention will have a color other than black or white. Such a colored layer is typically combined with a background layer that is colored black or white. In one embodiment, such a colored layer comprises interference pigment, which can provide aesthetically pleasing visual effects when incorporated in a web material of the present invention having a macroscopically three dimensional pattern. In one embodiment, the interference pigment is mica, commonly available in a variety of colors and particle sizes. The level of interference pigment in a layer of the colored web material can be from about 1% to about 50%, from about 2% to about 25%, or from about 4% to about 15%, by weight of the layer of the colored web material. Particle size ranges of the interference pigment can be from about 5 microns to about 120 microns, from about 5 microns to about 60 microns, or from about 5 microns to about 25 microns.

In one embodiment, the colorant is applied to the surface of the precursor web via a process such as letterpress, lithography, flexography, gravure, silk screen, or the like. Typically, the colorant will be applied to the surface to a thickness of from about 1 to about 20 microns. The thickness of the colorant coating can be varied to provide varied visual impressions, in addition to the visual impressions provided by forming the extended elements of the colored web of the present invention.

Processes for Making Colored Web Materials

A variety of processes can be utilized to produce a web material of the present invention comprising a plurality of discrete extended elements. In general, the web material of the present invention is produced by providing a precursor web and a forming structure, placing the precursor web on the forming structure, and applying pressure against the precursor web and forming structure to at least partially conform the precursor web to the topography of the forming structure to form a colored web material of the present invention. The pressure applied against the precursor web can be generated by various processes known in the art, including mechanical embossing, vacuum forming, and hydroforming.

A forming structure useful in the process of the present invention comprises a plurality of discrete protruded elements and lands completely surrounding the discrete protruded elements. The discrete protruded elements of the forming structure of the present invention are small in scale relative to typical patterns used on dies in embossing processes. The discrete protruded elements of the forming structure also have relatively high aspect ratios. This combination of properties can allow the process of the invention to produce colored webs comprising relatively high aspect ratio extended elements with thinned distal ends, even without heating the precursor web and even at high speeds.

The discrete protruded elements of the forming structure can be comprised of a variety of different shapes, such as generally columnar or non-columnar shapes, including circular, oval, square, triangular, hexagonal, trapezoidal, ridges, pyramids, hour-glass shaped, and the like, and combinations thereof. The discrete protruded elements can have various degrees of taper and can have a degree of curvature. The protruded elements can have sharp points, rounded points, flattened points, or combinations thereof. Forming structures with combinations of varying protruded element heights, shapes and or patterns can produce webs of the invention with especially desirable visual appearances.

A forming structure can be made of any material that can be formed to have protruded elements having the necessary dimensions to make a colored web of the present invention, and is dimensionally stable over process temperature and pressure ranges experienced by the forming structure. It has been found that relatively tall, high aspect ratio protruded elements form better colored webs as the modulus of the material of the forming structure increases, as long as it has sufficient strain at break (i.e., not too brittle) so as not to break.

In one embodiment, protruded elements are made integrally with the forming structure. That is, the forming structure is made as an integrated structure, either by removing material or by building up material. For example, forming structure having the required relatively small scale protruded elements can be made by local selective removal of material, such as by chemical etching, mechanical etching, or by ablating by use of high-energy sources such as electrical-discharge machines (EDM) or lasers, or by electron beam (e-beam), or by electrochemical machining (ECM). In one embodiment, the forming structure can be constructed by a photo-etched laminate process as described in U.S. Pat. No. 4,342,314.

Forming structures used to make the colored web material of the present invention can be in the form of a flat plate, a roll, a belt, a sleeve, or the like. In one embodiment, the forming structure is in the form of a roll.

Non-limiting examples of suitable forming structures include those described in U.S. Provisional Application Ser. No. 61/159,906 filed Mar. 13, 2009, U.S. Pat. Nos. 7,521,588, and 4,609,518.

The forming structure used to make the colored web material of the present invention can comprise depressions or apertures. If the forming structure comprises depressions or apertures, the precursor web can be forced into the depressions or apertures of the forming structure, such that discrete extended elements can be formed in the precursor web.

Forming structures used to make the colored web material of the present invention can comprise discrete protruded elements and optionally further comprise depressions or apertures. If the forming structure further comprises depressions or apertures, the precursor web can be forced into the depressions or apertures of the forming structure, such that discrete extended elements can be formed in the precursor web extending from the surface of the precursor web opposite the surface from which the discrete protruded elements are formed by the protruded elements of the forming structure. As a result, a two-sided colored web can be created, having different patterns or dimensions of extended elements on each side of the colored web. Depending upon the pressure generated against the forming structure and precursor web, as well as the geometric shapes of the protruded elements and optional depressions or apertures of the forming structure, the discrete extended elements of the colored web can have closed or open distal ends.

Forming structures used to make webs of the present invention can comprise discrete protruded elements, and/or depressions or apertures, in predetermined arrays to make designs or patterns, such as described in U.S. Pat. No. 5,158,819. Certain regions can be absent of discrete protruded elements, and/or depressions or apertures. Discrete protruded elements, and/or depressions or apertures, can optionally be at various elevations which can create both designs and color gradients as the extended elements will have varying degrees of thinning.

Discrete protruded elements, in the shape of ridges or grooves, can be arrayed in various alignments such as those described in U.S. Pat. No. 5,567,376.

In one embodiment, the protruded elements can have varying geometries, such as height, which can impact the particular color of the extended elements of the colored web material. For example, the protruded elements can gradually increase in height over a range of tens or hundreds of adjacent protruded elements, which can result in the colored web material exhibiting a color gradient effect in the area corresponding to such protruded elements.

In one embodiment, a suitable process for making a colored web of the present invention involves providing a forming structure as described herein, providing a compliant substrate, and generating a pressure between the forming structure and the compliant substrate. Suitable compliant substrates are described in detail in U.S. Provisional Application Ser. No. 61/159,906 filed Mar. 13, 2009. The process further involves providing a precursor web as described herein between the forming structure and the compliant substrate. The pressure between the forming structure and compliant substrate is sufficient to conform the precursor web to the forming structure to produce a colored web. The conformation of the precursor web to the forming structure can be partial conformation, substantial conformation, or complete conformation, depending upon the pressure generated and the topography of the forming structure. While not being bound by theory, it is believed that open distal ends can be formed by the process of the present invention by locally rupturing the precursor web while conforming the precursor web to the protruded elements of the forming structure. Such a process is described in detail in U.S. Provisional Application Ser. No. 61/159,906 filed Mar. 13, 2009.

Other suitable processes for making the colored web materials of the present invention include those processes typically described as hydroforming processes. Non-limiting examples of hydroforming processes are described in detail in U.S. Pat. No. 4,609,518 and U.S. Pat. No. 4,846,821. A forming structure and precursor web as described herein can be utilized in such hydroforming processes to produce colored web materials of the present invention.

Other suitable processes for making the colored web materials of the present invention further include those processes typically described as vacuum forming processes. Non-limiting examples of vacuum forming processes are described in detail in U.S. Pat. Nos. 4,456,570 and 4,151,240, and U.S. Application Publication No. 2004/0119207 A1. A forming structure and precursor web as described herein can be utilized in such vacuum forming processes to produce colored web materials of the present invention.

To get permanent deformation of the precursor web to form the colored web of the present invention, the precursor web is typically stretched by a given process beyond the yield point of the precursor web.

The process of the present invention can be a batch process or a continuous process.

Figure 9:
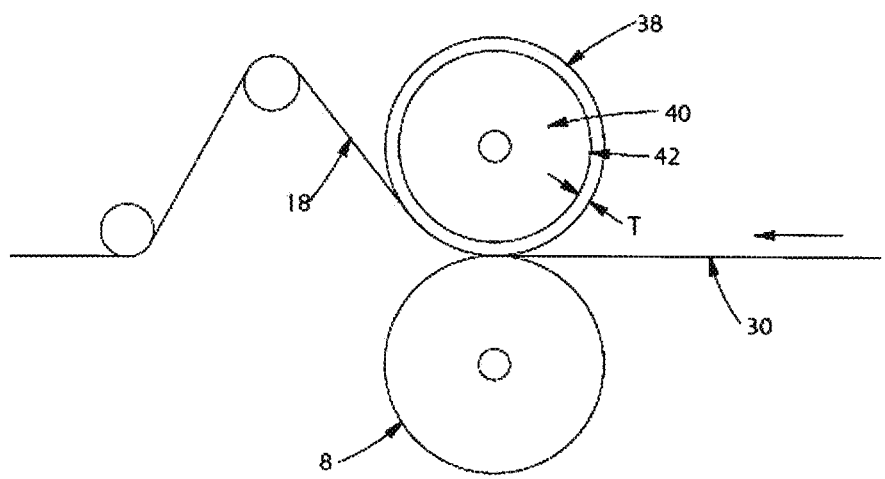
FIG. 9 is a schematic illustration of a continuous process for making a colored web of the present invention.

A continuous process can involve providing a roll of precursor web material that is unwound and fed between the forming structure and compliant substrate, each of which can be in the form of a roll. FIG. 9 illustrates one embodiment of a continuous process of the present invention wherein a precursor web 30 is fed between a forming structure roll 8 and a compliant substrate roll 38. The compliant substrate roll 38 comprises a rigid roll 40, such as a steel roll, that is covered with a compliant material 42. The compliant material 42 has a thickness T of about 3 mm. As the precursor web passes between the forming structure roll 8 and the compliant substrate roll 38, a colored web 18 is formed. Such a process is described in detail in U.S. Provisional Application Ser. No. 61/159,906 filed Mar. 13, 2009.

The process to make the colored web of the present invention will typically involve relatively short dwell times. As used herein, the term "dwell time" refers to the amount of time pressure is applied to a given portion of the precursor web, usually the amount of time a given portion of the precursor web spends positioned on the forming structure. For a process to make the colored web of the present invention, pressure is typically applied to the precursor web for a dwell time of less than about 5 seconds, less than about 1 second, less than about 0.01 second, less than about 0.005 second, or less than about 0.002 second. For example, the dwell time can be about 0.5 milliseconds to about 50 milliseconds. Even with such relatively short dwell times, colored webs can be produced with desirable structural features described herein. As a result, the process of the present invention enables high speed production of colored webs.

For a process to make a colored web of the present invention, especially for a continuous process, the precursor web can be formed against the forming structure at a rate of at least about 0.01 meters per second, at least about 1 meter per second, at least about 5 meters per second, at least about 7 meters per second, or at least about 10 meters per second. Other suitable rates include, for example, at least about 0.01, 0.05, 0.1, 0.5, 1, 2, 3, 4, 5, 6, 7, 8, 9, or 10 meters per second.

Depending upon factors such as the shape of the protrusions on the forming structure and the pressure applied, the distal ends of the extended elements of the colored web produced by the process of the present invention can be either closed or open.

A low strain rate process, such as that described in U.S. Application Publication No. 2008/0224351 A1, can also be used to produce a colored web of the present invention wherein the activation belt is a solid or compliant substrate.

The process of the present invention can optionally be combined with other processes to further manipulate the colored web. In one embodiment, such additional processes can be combined with the process of the present invention on the same process manufacturing line to produce, for example, absorbent articles. In one embodiment, the process of the present invention is combined with a process that can impart macroapertures in the colored web, such as the process described in US 2006/0087053 A1 or US 2005/0064136 A1. Such a process combination can produce a macroapertured colored web that can be suitable for use as a topsheet in an absorbent article. Such a macroapertured colored web can be subsequently converted into an absorbent article by combining it with other absorbent article components, such as absorbent cores, backsheets, and the like, preferably on the same process manufacturing line.

In an alternative embodiment, the compliant substrate can be replaced with fluid pressure, such as air pressure or water pressure. The pressures exerted on the precursor web by fluids such as air or water will typically be similar to those pressures exerted on the precursor web by the compliant substrate described hereinbefore.

One example of a device suitable for providing air pressure to conform the precursor web to the forming structure of the present invention is a high pressure air knife. High pressure air knives are commercially available from, for example, Canadian Air Systems. Another example of a suitable device and process utilizing air pressure to conform the precursor web to the forming structure is described in detail in U.S. Pat. No. 5,972,280.

An example of a device suitable for providing water pressure to conform the precursor web to the forming structure of the present invention is a water plenum, such as that described in U.S. Pat. No. 7,364,687.

Other suitable processes are described in co-pending U.S. application Ser. No. 12/721,989, filed Mar. 11, 2010 entitled "PROCESS FOR MAKING AN EMBOSSED WEB" (P&G Case 11636), U.S. application Ser. No. 12/722,002, filed Mar. 11, 2010 entitled "PROCESS FOR MAKING AN EMBOSSED WEB" (P&G Case 11637), and U.S. application Ser. No. 12/722/020, filed Mar. 11, 2010 entitled "PROCESS FOR MAKING AN EMBOSSED WEB" (P&G Case 11638).

Other suitable processes are described in U.S. Pat. No. 4,846,821 and U.S. Application Publication No. 2004/0119207 A1.

Uses of Colored or Translucent Webs Comprising a Plurality of Extended Elements

The colored or translucent webs of the present invention can be utilized in a variety of applications, including as component materials of absorbent articles (such as topsheets, backsheets or release paper wrappers), packaging (such as flow wrap, shrink wrap, or polybags), trash bags, food wrap, dental floss, wipes, electronic components, wall paper, clothing, aprons, window coverings, placemats, book covers, and the like.

EXAMPLES

The following non-limiting examples illustrate a variety of colored web materials of the present invention.

Example 1

A three layer film precursor film is prepared. The top layer comprises blue colorant particles in the form of mica-based interference pigment. The middle layer comprises a black colorant in the form of iron oxide. The bottom layer is a clear layer that is free of colorants.
Colorants:
Sensipearl #58241 Blue Mica-based Interference Pigment (particle size range: 10-60 microns)
Sensient #58040 Black Iron Oxide (particle size range: 0.09-0.11 microns)
Sensient Colors Inc. (2515 N. Jefferson Ave, St Louis, Mo., 63106-1903) supplies both colorants.

The solids are each blended into separate masterbatches using a Twin Screw Extruder to produce pellets. These pellets contain 25 wt % solids in a polyethylene blend of 80% LLDPE and 20% LDPE. A three-layer film is co-extruded, using the same 80/20 blend of LLDPE/LDPE, plus the appropriate masterbatches according to the following table:

|  | Wt % Loading per layer | Layer Ratios |
|---|---|---|
| Top Mica-containing Layer |  | 29% |
| Sensipearl #58241 | 32% |  |
| 80/20 LLDPE/LDPE | 68% |  |
| Middle Iron Oxide-containing Layer |  | 67% |
| Sensient #58040 | 68% |  |
| 80/20 LLDPE/LDPE | 32% |  |
| Bottom Clear Layer |  | 5% |
| 80/20 LLDPE/LDPE | 100% |  |

The total thickness of the extruder precursor film is about 23 microns (0.9 mil).

The precursor film is embossed at ambient temperature using a forming structure and a 6.4 mm (0.25") thick sheet of gum rubber (40 Durometer). The sheet of gum rubber is pressed against the forming structure, with the precursor film therebetween, under an apparent pressure of 1650 psi, with the top mica-containing layer facing the rubber sheet.

Figure 10:
FIG. 10 is a photograph of a portion of a forming structure suitable for producing a colored web of the present invention.

FIG. 10 shows the forming structure utilized that comprises areas comprising a plurality of protruded elements (i.e. the lighter areas in FIG. 10) and areas having no protruded elements (i.e. the darker areas in FIG. 10) that can be used to make the colored web material of Example 1. The protruded elements are arranged to create a flower design in those areas that are free of protruded elements.

Figure 11:
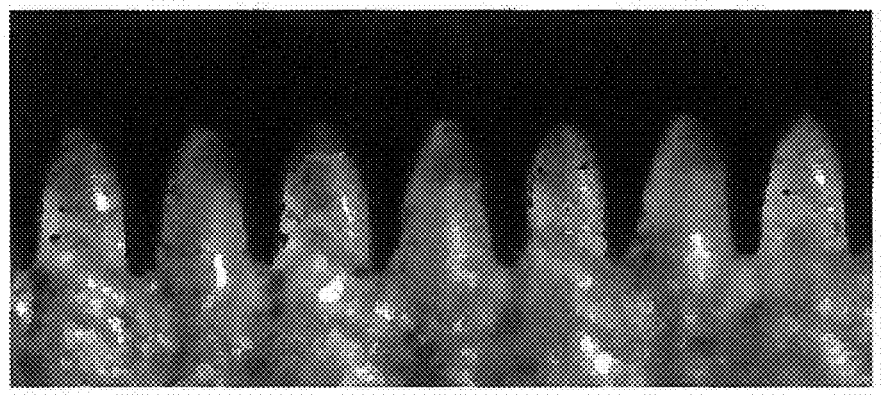
FIG. 11 is a photomicrograph showing a side view of protruded elements of a forming structure suitable for producing a colored web of the present invention.

FIG. 11 provides a high magnification side view of the relatively sharp protruded elements of the forming structure shown in FIG. 10, wherein the protruded elements are spaced apart at about 205 microns from center-to-center and are about 215 microns tall.

Figure 12:
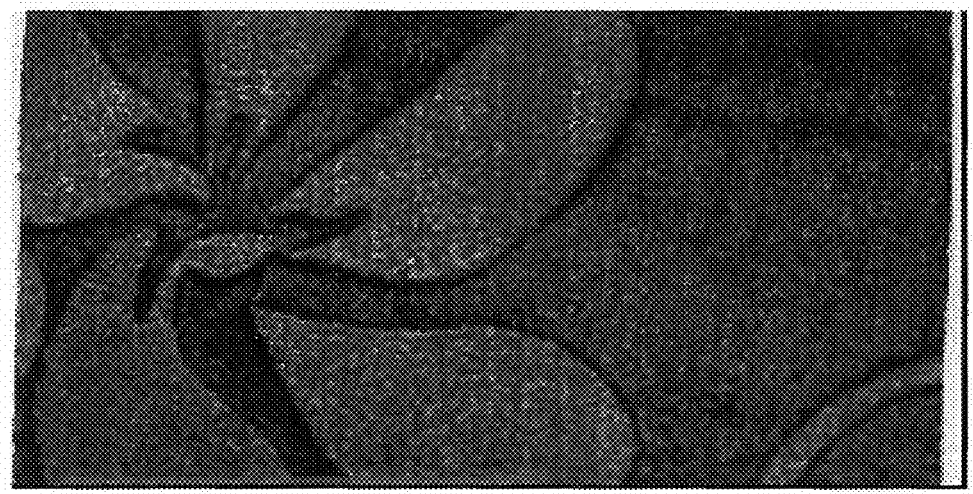
FIG. 12 is a photograph of a portion of a colored web of the present invention.

FIG. 12 is a photomicrograph of the colored web of Example 1. The discrete extended elements of the colored film material have a darker blue color than the areas having no extended elements due to the black middle layer becoming partially visible through the thinned open and closed distal ends of the extended elements of the colored film.

Figure 13:
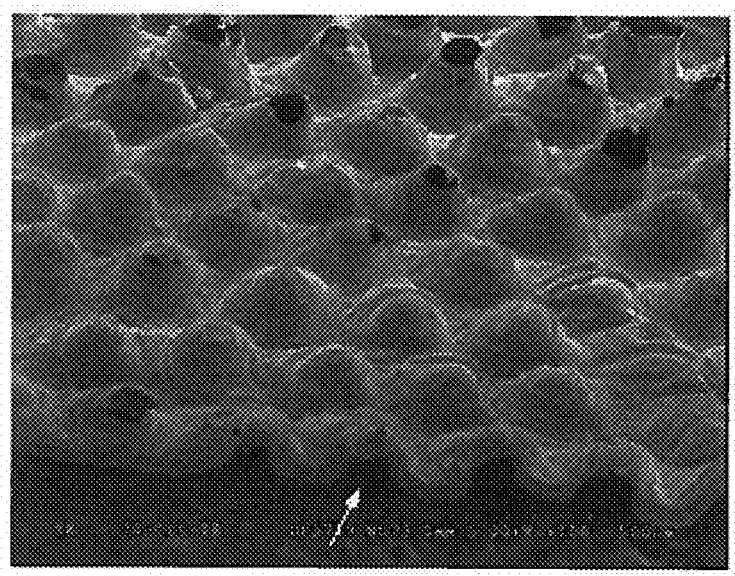
FIG. 13 is a photomicrograph of a portion of a colored web of the present invention showing extended elements having closed distal ends.

FIG. 13 is a photomicrograph top view of a portion of the colored film material of Example 1, wherein a majority of the discrete extended elements have closed distal ends.

Figure 14:
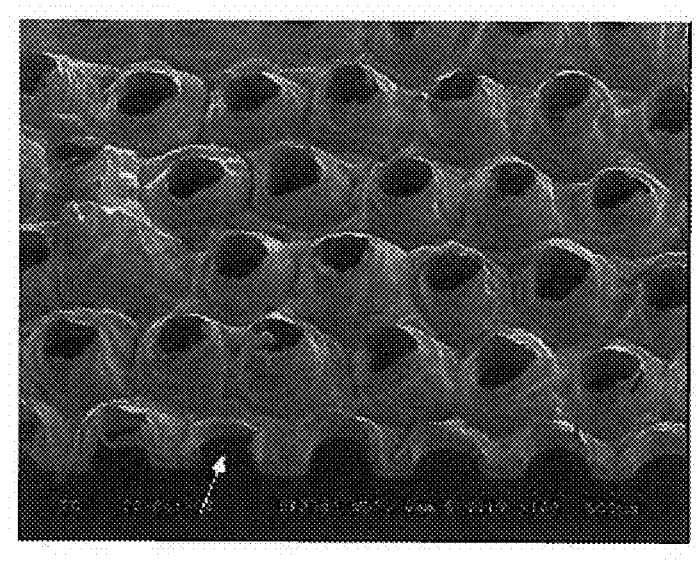
FIG. 14 is a photomicrograph of a portion of a colored web of the present invention showing extended elements having open distal ends.

FIG. 14 is a photomicrograph top view of a portion of the colored film material of Example 1, wherein a majority of the discrete extended elements have open distal ends.

Example 2

A two layer film precursor web material is prepared. The top layer comprises purple colorant particles in the form of mica-based interference pigment and the bottom layer comprises a black colorant in the form of carbon black.
Colorants:
Clariant # PE02709843 Purple Mica-based Interference Pigment (5-25 micron mica particle size range)
Clariant # PL94620002 Carbon Black (2-10 micron particle size range)
Clariant Corporation (10999 Reed Hartman Hwy, Ste 201, Cincinnati, Ohio, 45242) supplies both colorants in the form of masterbatches. The carrier resin is a 20 melt flow index LLDPE. The mica masterbatch contains about 40 wt % mica.

A two-layer film is co-extruded, using LDPE and LLDPE resins, plus the appropriate masterbatches according to the following table:

|  | Wt % Loading per Layer | Layer Ratios |
|---|---|---|
| Top Layer (Mica-Containing) |  | 64 |
| Exxonmobil LD 117 | 54 |  |
| Dowlex 2045G LLDPE | 14 |  |
| Clariant PE02709843 Purple Mica | 32 |  |
| Bottom Layer (Carbon Black Containing) |  | 36 |
| Dowlex 2045G LLDPE | 15 |  |
| Exxonmobil LD 117 | 61 |  |
| Clariant PL9462002 Carbon Black | 24 |  |

The total thickness of the extruder precursor film is about 25 microns (1 mil).

The film is embossed at ambient temperature using a forming structure comprising a plurality of protruded elements and a compliant material that is a 0.25" thick sheet of closed cell foam rubber (available from Netherland Rubber Co., 2931 Exon Ave., Cincinnati, Ohio, 45241; Part number SNC-1, neoprene/EPDM base polymer, Durometer (Shore 00) 30-45). The protruded elements of the forming structure are pushed into the black bottom layer of the film under an apparent pressure of about 3,200 psi.

Figure 15:
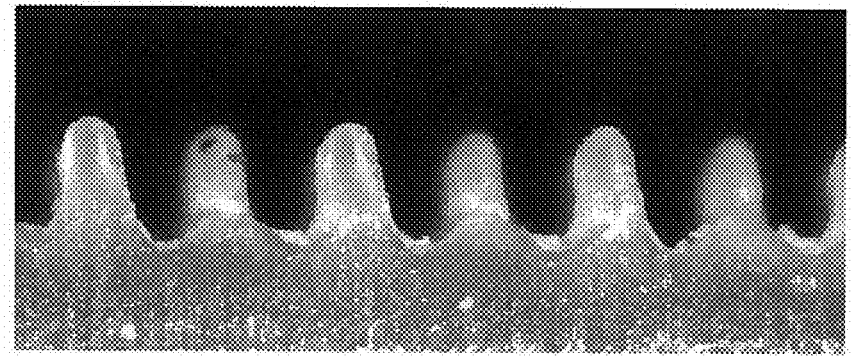
FIG. 15 is a photomicrograph showing a side view of protruded elements of a forming structure suitable for producing a colored web of the present invention.

FIG. 15 is a high magnification side view of the relatively round-tipped protruded elements of the forming structure used to make the colored film material of the Example 2, spaced at about 254 microns center-center and are about 192 microns tall. The protruded elements of the forming structure are arranged to create a flower design in those areas absent protruded elements.

Figure 16:
FIG. 16 is a photograph of a colored web of the present invention used as an outer wrapper for a feminine hygiene pad.

FIG. 16 is a photograph of the colored film of Example 2, where the colored film is used as an outer wrapper for a feminine hygiene pad. The discrete extended elements have a darker purple color than areas having no discrete extended elements due to the black layer becoming partially visible through the thinned distal ends of the extended elements of the colored film.

Example 3

A two layer film precursor film is prepared. The top layer comprises blue colorant particles in the form of a mica-based interference pigment and the bottom layer comprises a white colorant in the form of titanium dioxide.

Colorants:
Clariant # PE52709905 Blue Mica-based Interference Pigment (5-25 micron mica particle size range)
Ampacet 110573-B Titanium dioxide master batch (67 wt % $TiO_2$)
Clariant Corporation (10999 Reed Hartman Hwy, Ste 201, Cincinnati, Ohio, 45242) supplies the mica-based interference pigment in the form of a masterbatch. The carrier resin is a 20 melt flow index LLDPE. The mica-based masterbatch contains about 40 wt % mica-based interference pigment and about 15 wt % of a blue pigment.

Ampacet Corporation (3701 North Fruitridge Avenue, Terre Haute, Ind. 47804) supplies the white titanium dioxide masterbatch.

The two layer precursor film material is co-extruded, using LDPE and LLDPE resins, plus the appropriate colorant mixtures according to the following table:

|  | Wt % Loading per Layer | Layer Ratios |
|---|---|---|
| Mica Containing Layer |  | 60 |
| Exxonmobil LD 117 | 14 |  |
| Dowlex 2045G LLDPE | 56 |  |
| Clariant PE52709905 Blue Mica master batch | 30 |  |
| Titanium Dioxide Containing Layer |  | 40 |
| Dowlex 2045G LLDPE | 67 |  |
| Exxonmobil LD 117 | 17 |  |
| Ampacet 110573-B Titanium dioxide master batch | 16 |  |

The total thickness of the extruded film is about 18 microns (0.7 mil).
The extruder precursor film is embossed under the same conditions as Example 2.

Figure 17:
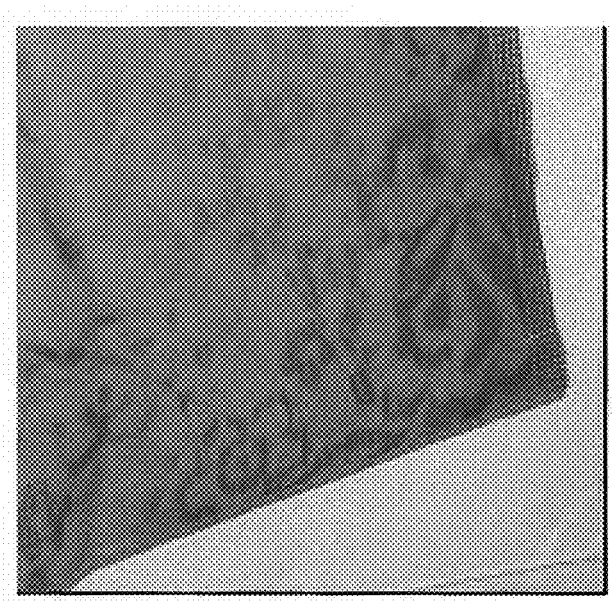
FIG. 17 is a photograph of a colored web of the present invention used as an outer wrapper for a feminine hygiene pad.

FIG. 17 is a photograph of the colored film of Example 3, where the film is used as an outer wrapper for a feminine hygiene pad. The discrete extended elements have a lighter blue color than the areas having no discrete extended elements due to the white layer becoming partially visible through the thinned distal ends of the discrete extended elements of the colored film.

Example 4

An iridescent film, Aurora Special Effect Film, Aurora Film IF4781 Red Green 56, obtained from BASF Corporation (100 Campus Drive, Florham Park, N.J., 07932), is used as a precursor web to make a colored film of the present invention. The thickness is about 16 microns.

The precursor film is embossed at ambient temperature using a forming structure comprising a plurality of protruded elements and a compliant material which is a 6.4 mm (0.25") thick sheet of gum rubber (40 Durometer), under an apparent pressure of about 24.3 MPa (3530 psi). The protruded elements of the forming structure are about 250 microns tall, about 105 micron in diameter, and are disposed in a hexagonal array at about 270 mil center-to-center spacing.

Figure 18:
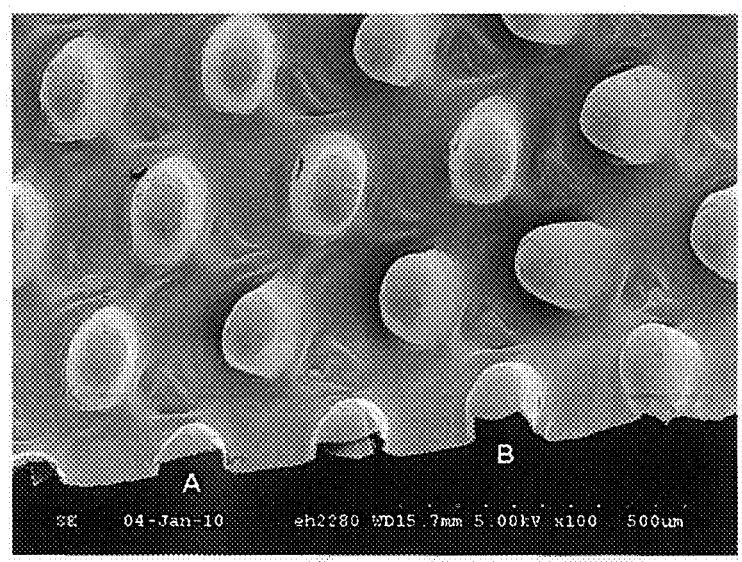
FIG. 18 is a photomicrograph showing a top view of a portion of a colored web of the present invention.

FIG. 18 is a photomicrograph of a top view of a portion of the colored film of Example 4.

Figure 19:
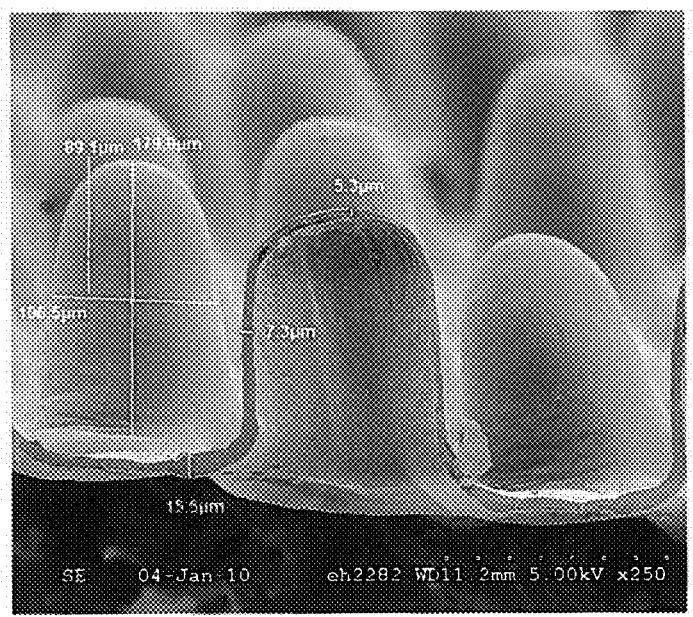
FIG. 19 is a photomicrograph showing a cross-sectional view of a portion of the colored web of FIG. 18.

FIG. 19 is a photomicrograph of a side view of a portion of the colored film of FIG. 18, wherein the cross-sectional view of a discrete extended element shows thinning of the precursor web at the distal end of the extended element (about 5.3 microns in thickness) and along the sidewall of the extended element (about 7.3 microns in thickness), as compared to the land area surrounding the discrete extended element (about 15.5 microns in thickness).

Example 5

Two precursor films are co-embossed. An iridescent film, Aurora Special Effect Film Fluoridescent™ Groovey Green FG 8601 RG-56, obtained from Engelhard Corporation (101 South Wood Avenue, Iselin, N.J., 08830), is used as one of the precursor films.

The other precursor film is prepared in the same way as the precursor film described in Example 1, except that Sensipearl #58201 Green Mica-based Interference Pigment (particle size range of 10-60 microns), is used in place of the Sensipearl #58241 Blue Mica-based Interference Pigment.

The precursor films are co-embossed to make a colored film of the present invention at ambient temperature using the same forming structure as described in Example 2. The precursor films are arranged with the iridescent film on top of the mica-containing film, where the carbon black side facing up and the green side down, away from the iridescent film. The protruded elements of the forming structure are pushed up into the green side of the lower, mica-containing film, embossing with a compliant material that is a 6.4 mm (0.25") thick sheet of gum rubber (40 Durometer), under an apparent pressure of 2200 psi.

Figure 20:
FIG. 20 is a photograph of a portion of a colored web of the present invention.

FIG. 20 is a photograph of the iridescent film side of the colored film of Example 5.

Figure 21:
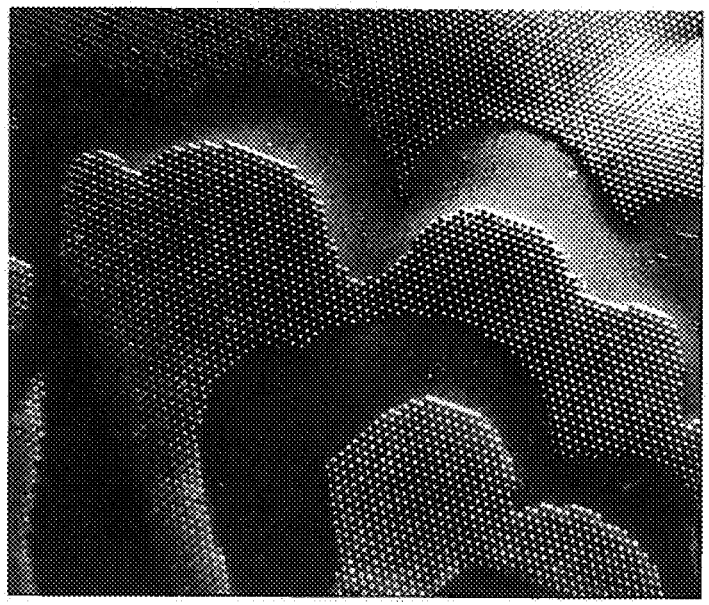
FIG. 21 is a further magnified photograph of a portion of the colored web of FIG. 20.

FIG. 21 is a magnified photograph of the colored film shown in FIG. 20, showing areas without extended elements (e.g. the darker areas) and areas with extended elements (e.g. the lighter areas).

Figure 22:
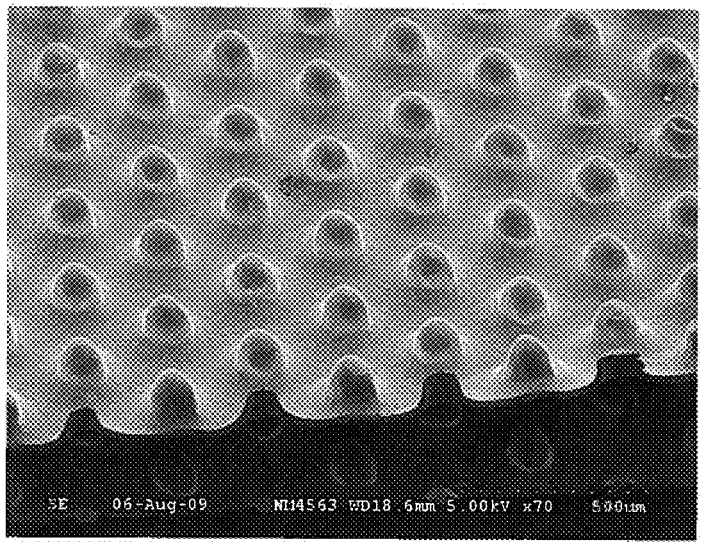
FIG. 22 is a photomicrograph of a top view of a portion of the colored web of FIG. 20.

FIG. 22 is a photomicrograph top view of a portion of the colored film of Example 5.

Figure 23:
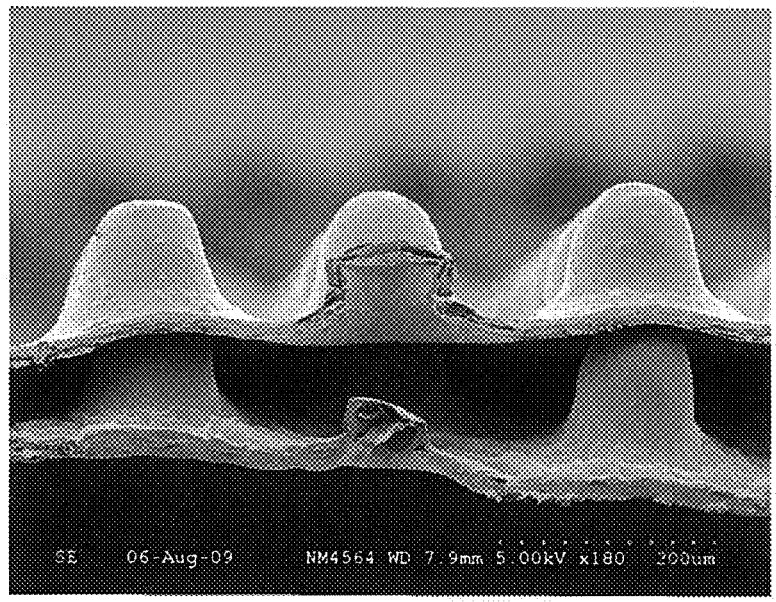
FIG. 23 is a photomicrograph of a side view of a portion of the colored web of FIG. 22.

FIG. 23 is a photomicrograph side view of a portion of the colored film of Example 5. This side view shows the iridescent film on top of the mica-containing film, wherein the extended elements are nested.

Example 6

The precursor film utilized in Example 6 is an iridescent film, Aurora Special Effect Film Diamond Fire 9601 RY, obtained from Engelhard Corporation (101 South Wood Avenue, Iselin, N.J., 08830).

The precursor film is embossed at ambient temperature using a forming structure comprising a plurality of protruded elements and a compliant substrate that is a 6.4 mm (0.25") thick sheet of gum rubber (40 Durometer) under an apparent pressure of 1100 psi. The protruded elements of the forming structure are about 250 microns tall, and are arranged in a hexagonal array at a center-to-center spacing of about 350 microns. The protruded elements of the forming structure are arranged to create a rose design in those areas absent protruded elements.

Figure 24:
FIG. 24 is a photograph perspective view of a colored web of the present invention.

FIG. 24 is a photograph perspective view of the colored film of Example 6.

Figure 25:
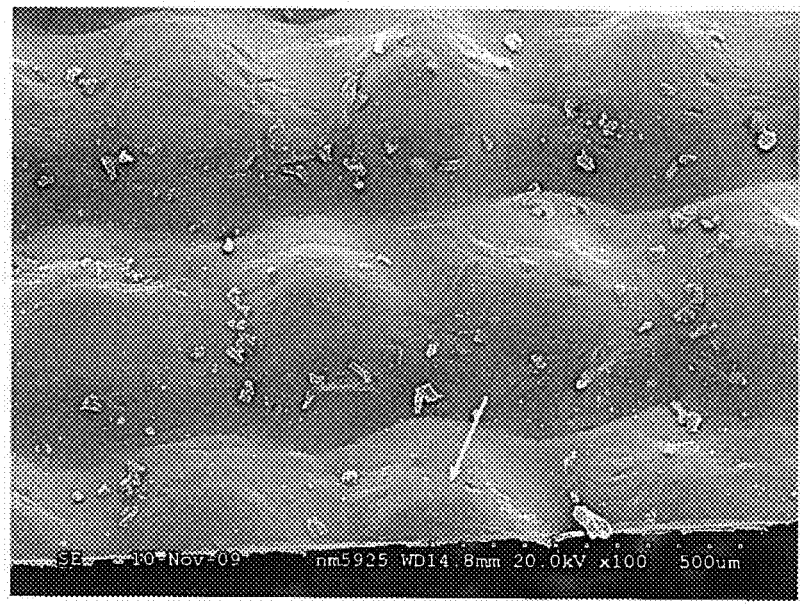
FIG. 25 is a photomicrograph top view of a portion of the colored web of FIG. 24.

FIG. 25 is a photomicrograph top view of a portion of the colored film of Example 6.

Figure 26:
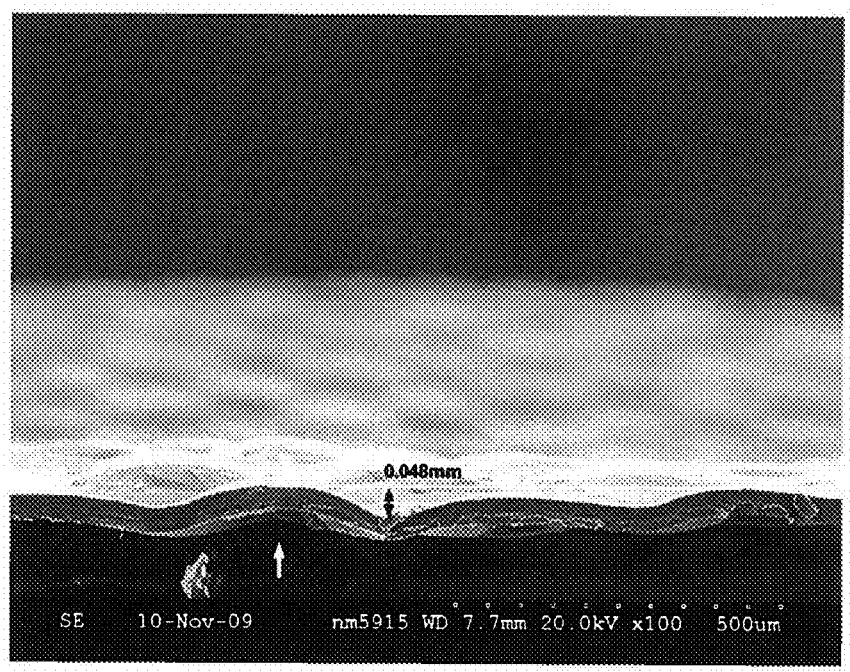
FIG. 26 is a photomicrograph side view of a portion of the colored web of FIG. 25.

FIG. 26 is a photomicrograph side view of the colored film of Example 6, showing that the extended elements of the colored film exhibit very little thinning at the distal ends or along the sidewalls of the extended elements. In addition, the aspect ratio of the extended elements is relatively small. Despite having little thinning and a small aspect ratio, the extended elements provide a desirable visual affect, as shown in FIG. 24.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

When a technical feature is disclosed herein in relation to one embodiment, this feature can be combined with any other feature(s) disclosed in other embodiment(s) or claim(s), unless stated otherwise.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multi-layer colored web material exhibiting viewing-angle dependent color and comprising a first web material and a second web material, wherein said first web material comprises a first polymer having first refractive properties and said second web material comprises a second polymer having second refractive properties, wherein said first refractive properties of said first polymer are different than said second refractive properties of said second polymer, wherein said multi-layer colored web comprises at least 10 layers, wherein each of said layers is between 30 and about 500 nanometers in thickness, and wherein the refractive indices of contiguous adjacent layers differ by at least 0.03; wherein said multi-layer colored web material comprises a plurality of discrete extended elements extending outwardly from a surface thereof and comprising open proximal ends, distal ends, and sidewalls; wherein said distal ends of some of the plurality of discrete extended elements are open and wherein said distal ends of others of the plurality of discrete extended elements are closed; and wherein:
   (a) said discrete extended elements have a diameter of less than about 500 microns;
   (b) said discrete extended elements have an aspect ratio of at least about 0.2; and/or
   (c) said multi-layer colored web material comprises at least about 95 discrete extended elements per square centimeter;
   wherein said discrete extended elements comprise thinned portions at said distal ends of said discrete extended elements and/or along said sidewalls of said discrete extended elements, and said discrete extended elements exhibit a different visible color than the land areas around the discrete extended elements due to different wavelengths of light reflected in the discrete extended elements.

2. The multi-layer colored web material of claim 1, wherein said thinned portions of said discrete extended elements exhibit thinning of at least about 25% relative to the thickness of land area surrounding said discrete extended elements of said multi-layer colored web.

3. The multi-layer colored web material of claim 1, wherein said thinned portions of said discrete extended elements are at said distal ends of said discrete extended elements.

4. The multi-layer colored web material of claim 1, wherein said thinned portions of said discrete extended elements are along said sidewalls of said discrete extended elements.

5. The multi-layer colored web material of claim 1, wherein said discrete extended elements have a diameter of less than about 500 microns.

6. The multi-layer colored web material of claim 5, wherein said discrete extended elements have a diameter of less than about 300 microns.

7. The multi-layer colored web material of claim 1, wherein said discrete extended elements have an aspect ratio of at least about 0.2.

8. The multi-layer colored web material of claim 7, wherein said discrete extended elements have an aspect ratio of at least about 0.5.

9. The multi-layer colored web material of claim 1, wherein, said colored web material comprises at least about 95 discrete extended elements per square centimeter.

10. The multi-layer colored web material of claim 9, wherein, said colored web material comprises at least about 500 discrete extended elements per square centimeter.

11. A colored web material exhibiting viewing-angle dependent color, said colored web material comprising a plurality of discrete extended elements extending outwardly from a surface thereof and comprising open proximal ends, distal ends, and sidewalls, wherein said colored web material comprises an interference pigment incorporated in said colored web material, wherein said interference pigment comprises a base substrate particle comprised of natural or synthetic mica, borosilicate glass, silica, or mixtures thereof; wherein said distal ends of some of the plurality of discrete extended elements are open and wherein said distal ends of others of the plurality of discrete extended elements are closed; and wherein:
   (a) said discrete extended elements have a diameter of less than about 500 microns;
   (b) said discrete extended elements have an aspect ratio of at least about 0.2; and/or
   (c) said colored web material comprises at least about 95 discrete extended elements per square centimeter;
   wherein said discrete extended elements comprise thinned portions at said distal ends of said discrete extended elements and/or along said sidewalls of said discrete extended elements, and said discrete extended elements exhibit a different visible color than the land areas around the discrete extended elements due to different wavelengths of light reflected by the interference pigment incorporated in the colored web material.

12. The colored web material of claim 11, wherein said thinned portions of said discrete extended elements exhibit thinning of at least about 25% relative to the thickness of land area surrounding said discrete extended elements of said colored web.

13. The colored web material of claim 11, wherein said colored web material is comprised of a precursor web comprising a thermoplastic film.

14. The colored web material of claim 13, wherein said precursor web has a thickness of from about 5 to about 150 microns.

15. The colored web material of claim 11, wherein said thinned portions of said discrete extended elements are at said distal ends of said discrete extended elements.

16. The colored web material of claim 11, wherein said thinned portions of said discrete extended elements are along said sidewalls of said discrete extended elements.

17. The colored web material of claim 11, wherein said discrete extended elements have a diameter of less than about 500 microns.

18. The colored web material of claim 17, wherein said discrete extended elements have a diameter of less than about 300 microns.

19. The colored web material of claim 11, wherein said discrete extended elements have an aspect ratio of at least about 0.2.

20. The colored web material of claim 19, wherein said discrete extended elements have an aspect ratio of at least about 0.5.

21. The colored web material of claim 11, wherein, said colored web material comprises at least about 95 discrete extended elements per square centimeter.

22. The colored web material of claim 21, wherein, said colored web material comprises at least about 500 discrete extended elements per square centimeter.

23. A packaging or release paper wrapper comprising the multi-layer colored web material of claim 1.

24. A packaging or release paper wrapper comprising the colored web material of claim 11.

25. The colored web of claim 1, wherein some of said plurality of discrete extended elements have closed distal ends and others of said plurality of discrete extended elements have open distal ends.

26. The colored web of claim 11, wherein some of said plurality of discrete extended elements have closed distal ends and others of said plurality of discrete extended elements have open distal ends.

27. A colored web material exhibiting viewing-angle dependent color, said colored web material comprising a plurality of discrete extended elements comprising open proximal ends, distal ends, and sidewalls, wherein said colored web material comprises an interference pigment incorporated in said colored web material,
   (a) wherein said distal ends of some of the plurality of discrete extended elements are open and wherein said distal ends of others of the plurality of discrete extended elements are closed; and
   (b) wherein said colored web material comprises at least about 95 discrete extended elements per square centimeter.

28. The colored web of claim 27, wherein said distal ends of a majority of said plurality of discrete extended elements are open.

29. The colored web of claim 27, wherein said distal ends of a majority of said plurality of discrete extended elements are closed.

30. A multi-layer colored web material exhibiting viewing-angle dependent color and comprising a first web material and a second web material, wherein said first web material comprises a first polymer having first refractive properties and said second web material comprises a second polymer having second refractive properties, wherein said first refractive properties of said first polymer are different than said second refractive properties of said second polymer, wherein said multi-layer colored web material comprises a plurality of discrete extended elements comprising open proximal ends and sidewalls, some of the plurality of discrete extended elements comprising open distal ends and others of the plurality of discrete extended elements comprising closed distal ends, and wherein
   (a) said discrete extended elements have a diameter of less than about 500 microns;
   (b) said discrete extended elements have an aspect ratio of at least about 0.2; and/or
   (c) said multi-layer colored web material comprises at least about 95 discrete extended elements per square centimeter.

31. The colored web of claim 30, wherein said distal ends of a majority of said plurality of discrete extended elements are open.

32. The colored web of claim 30, wherein said distal ends of a majority of said plurality of discrete extended elements are closed.

* * * * *